(12) United States Patent
Someno et al.

(10) Patent No.: US 6,536,412 B2
(45) Date of Patent: Mar. 25, 2003

(54) CONTROL DEVICE FOR INTERNAL COMBUSTION ENGINE

(75) Inventors: Tadashi Someno, Hitachinaka (JP); Masami Nagano, Hitachinaka (JP); Yuzo Kadomukai, Ishioka (JP); Yoshio Okamoto, Minori (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/799,613

(22) Filed: Mar. 7, 2001

(65) Prior Publication Data

US 2001/0023681 A1 Sep. 27, 2001

(30) Foreign Application Priority Data

Mar. 16, 2000 (JP) ........................................ 2000-074318

(51) Int. Cl.⁷ ............................................... F02B 31/00
(52) U.S. Cl. ........................ 123/436; 123/478; 123/308
(58) Field of Search ................................. 123/436, 306, 123/308, 478

(56) References Cited

U.S. PATENT DOCUMENTS

| | | | | |
|---|---|---|---|---|
| 5,209,201 A | * | 5/1993 | Horie et al. ................. | 123/308 |
| 5,551,392 A | * | 9/1996 | Yamaji et al. ............... | 123/308 |
| 5,640,941 A | * | 6/1997 | Hazen et al. ................ | 123/308 |
| 5,671,713 A | * | 9/1997 | Yamaguchi et al. ........ | 123/308 |
| 5,704,333 A | * | 1/1998 | Okumura et al. ........... | 123/308 |
| 5,964,201 A | * | 10/1999 | Dickers et al. ............. | 123/306 |

* cited by examiner

Primary Examiner—Erick Solis
(74) Attorney, Agent, or Firm—Crowell & Moring LLP

(57) ABSTRACT

A control device for an internal combustion engine including fuel injection valves which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with and during an air intake stroke for the internal combustion engine as well as respective injection ports of the fuel injection valves are positioned at or near an accelerated air flow portion formed by the air flow velocity accelerating means. Thereby, in a multi point fuel injection system quality and spatial formation of air fuel mixture in the respective cylinders is enhanced and transportation time delay due to atomization of injected fuel droplet diameter is eliminated.

14 Claims, 13 Drawing Sheets

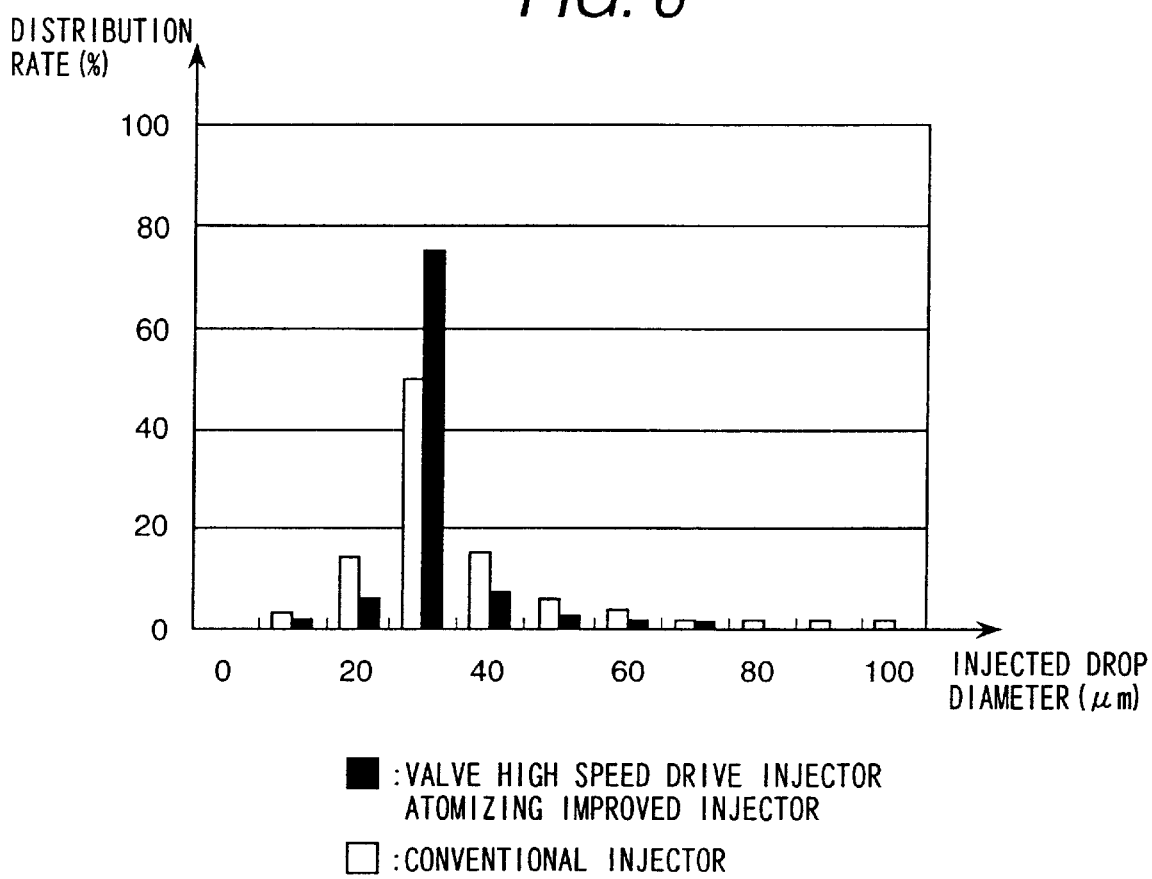
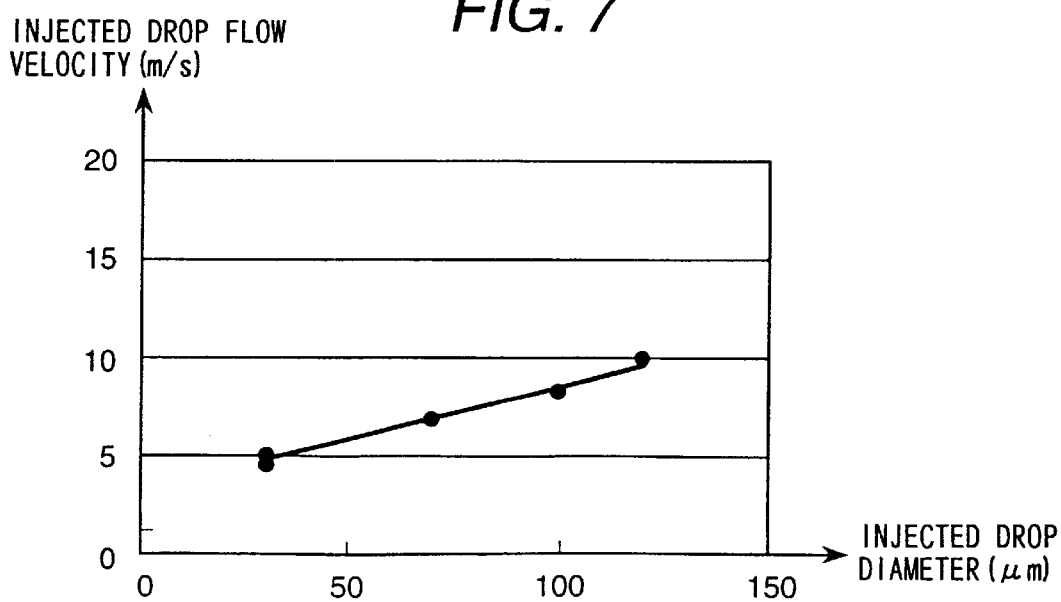

CONTROL DEVICE FOR INTERNAL COMBUSTION ENGINE

BACKGROUND OF THE INVENTION

1. Field of the Invention

The present invention relates to a control device for an internal combustion engine and, in particular, relates to a control device for an internal combustion engine which causes a fuel injection valve disposed at an air intake port to inject and supply atomized fuel during an air intake stroke.

2. Conventional Art

These days, requirements of environmental protection relating to automobiles including exhaust gas regulation and fuel economy regulation become strict day by day. Therefore, in order to enhance exhaust gas property and fuel economy a variety of internal combustion engines such as a lean burn engine and direct injection engine have been proposed.

The above direct injection engine requires a lot of alternation with respect to a base engine such as requirement of new surrounding devices other than the requirement of a piston head having a specific configuration and causes a problem of increasing a manufacturing cost. For this reason, a development activity improving combustion in an internal combustion engine by making use of a lean burn engine is, in particular, continued.

The lean burn engine is an engine which is designed to burn leaned air fuel mixture, in which fuel is injected in such engine through a plurality of fuel injection valves each provided for respective cylinders in synchronism with the air intake stroke, in that through a multi point injection (MPI) system, thereby, the leaning of the air fuel mixture is realized as well as a flammable rich air fuel mixture is concentrated only around an ignition plug and thus an enhancement of the exhaust gas property and the fuel economy is achieved.

Further, in order to enhance the exhaust gas property and the fuel economy for such internal combustion :engine, it is necessary to enhance the quality and formation of the air fuel mixture in the respective cylinders. For this purpose, a variety of technical measures of improving combustion in internal combustion engines are proposed, for example, such as in JP-A-11-13585 (1999) and JP-A-11-159424 (1999) by atomizing a droplet diameter of the fuel injected by a fuel injection valve below 70 μm, by atomizing a droplet diameter of the injected fuel through the provision of multi aperture injection ports in the fuel injection valve and by injecting fuel at the center portion of the air intake port through the provision of a forwardly positioned injection port (through nozzle elongation).

Now, the above referred to conventional art intends to enhance the exhaust gas property and the fuel economy in the internal combustion engine by atomizing the droplet diameter of the injected fuel and further, by forwardly positioning the injection port in view of the facts that the deposition of the injected fuel such as at the intake port and at the cylinders deteriorates the exhaust gas property, in other words so as to resolve the wetness property of the fuel.

Although, through the atomization of the droplet diameter of the injected fuel the deterioration of the exhaust gas property due to deposition of the injected fuel such as on the cylinders is resolved, however, since the kinetic energy of the atomized injected fuel is small in comparison with that of the injected fuel having a usual droplet diameter, thus the so called penetration force of the injected fuel after being injected from the fuel injection valve until arriving into the concerned cylinder is also small so that there remains a problem of delaying time until arrival of the injected fuel into the cylinder.

The present inventors found out a problem that the above referred to time delay makes it difficult to inject the fuel immediately after or in other words in synchronism with the air intake stroke under the fuel injection system of MPI, in that the fuel has to be injected earlier, and necessity of taking a proper countermeasure for resolving the problem. The above referred to conventional art only takes into consideration of resolving the wetness of the fuel, but not takes into any particular consideration of resolving the time delay.

SUMMARY OF THE INVENTION

The present invention is completed in view of the above problems and an object of the present invention is to provide a control device for an internal combustion engine under a fuel injection system of MPI which enhances quality and formation of air fuel mixture in cylinders and resolves the time delay caused by the atomization of droplet diameter of the injected fuel.

A control device for an internal combustion engine according to the present invention which achieves the above object basically comprises fuel injection vales which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with or immediately after an air intake stroke for the internal combustion engine as well as respective injection ports of the fuel injection valves are positioned at an accelerated air flow portion or near the accelerated air flow portion formed by the air flow velocity accelerating means, thereby, a time delay caused by atomization of the injected fuel is resolved.

According to the thus constituted control device for an internal combustion engine, since the fuel injected under the fuel injection system of MPI makes use of the accelerated air flow formed by the air flow velocity acceleration means as well as the fuel injection time is correctly set to synchronism with the air intake stroke, for example, even when there are restrictions with regard to the design and/or the attachment position of the fuel injection valves, the time delay due to the atomization of the injected fuel can be resolved as well as the quality and spatial formation of the air fuel mixture in the respective cylinders are enhanced, thereby, the exhaust gas property and fuel economy are enhanced.

Further, an embodiment of the control device for an internal combustion engine according to the present invention is characterized, in that the fuel injection time of the fuel injection valves is determined by setting a fuel injection start timing or a fuel injection completion timing during the air intake stroke, more specifically the fuel injection time is controlled by the fuel injection start timing or the fuel injection completion timing so that an optimum air fuel mixture is formed, the fuel injection time is set near the maximum air flow velocity occurring period when the air flow velocity in the air intake port is high or the fuel injection time is set before the maximum air flow velocity occurring period when the air flow velocity in the intake port is low.

In the thus constituted control device for an internal combustion engine according to the present invention, since the setting of the fuel injection time is altered depending on the air flow velocity in the air intake port, a fuel injection in an optimum air fuel mixture forming range can be realized, even if variation of combustion is caused depending on engine rpm and load, thereby, a fuel transportation delay due to droplet diameter atomization of the injected fuel is eliminated as well as the quality and spatial formation of air fuel mixture in the cylinders are further enhanced.

Further, another embodiment of the control device for an internal combustion embodiment is characterized, in that the device is provided with means for performing arithmetic operation of a revolution fluctuation index representing a combustion stability for the internal combustion engine and the setting of the fuel injection time of the fuel injection valves is corrected based on the arithmetic operation result by the means for performing arithmetic operation of the revolution fluctuation index.

In the thus constituted control device for an internal combustion engine according to the present invention, since the fuel injection valves are driven with reference to a signal from the means for performing arithmetic operation of a revolution fluctuation index, even if the fuel injection time deviates from one that forms an optimum air fuel mixture, the deviation can be corrected to ensure reliability of the internal combustion engine.

Still further, still another embodiment of the control device for an internal combustion engine is characterized, in that each of the fuel injection valves is provided with an elongated value main body so that all of the fuel injected from the respective injection ports is supplied into the respective cylinders, a distance from the respective injection ports to the respective cylinders are set depending on the atomized droplet diameter of the fuel to be injected from the respective injection ports, the respective valve bodies in the respective fuel injection valves are driven in a high speed so as to enhance atomization of the fuel injected from the respective injection ports as well as to uniformalize the droplet diameter of the fuel injected from the injection ports from the beginning of injection to the end thereof, and further characterized, in that the droplet diameter of injected fuel is controlled below about 70 $\mu$m.

The thus constituted control device for an internal combustion engine according to the present invention can be adapted to a variety of internal combustion engines even when the available droplet diameter is different depending on the performance of the internal combustion engines in association with the above explained fuel injection valves having the elongated valve main body, thereby, the transportation delay of the injected fuel due to atomization is further eliminated. Further, in association with the above explained fuel injection time, in the present control device, the atomized fuel is injected in a short time at an optimum timing, the time delay of the injected fuel arrival due to atomization of the injected fuel droplet diameter is eliminated, as well as the quality and spatial formation of the air fuel mixture in the respective cylinders are further enhanced. Still further, with the above explained structure of the fuel injection valves the manufacturing cost of the device can be reduced by limited modification of such as base engine.

BRIEF DESCRIPTION OF THE DRAWINGS

FIG. 6 is a distribution diagram of injected fuel droplet diameters from the fuel injection valve as shown in FIGS. 3A and 3B and from a conventional fuel injection valve;

FIG. 7 is a diagram illustrating a relationship between injected fuel droplet diameter from the fuel injection valve as shown in FIGS. 3A and 3B and injected fuel droplet flow velocity;

DETAILED DESCRIPTION OF THE PREFERRED EMBODIMENTS

Hereinbelow, an embodiment of the control device for an internal combustion engine according to the present invention will be explained with reference to the drawings.

Figure 1:
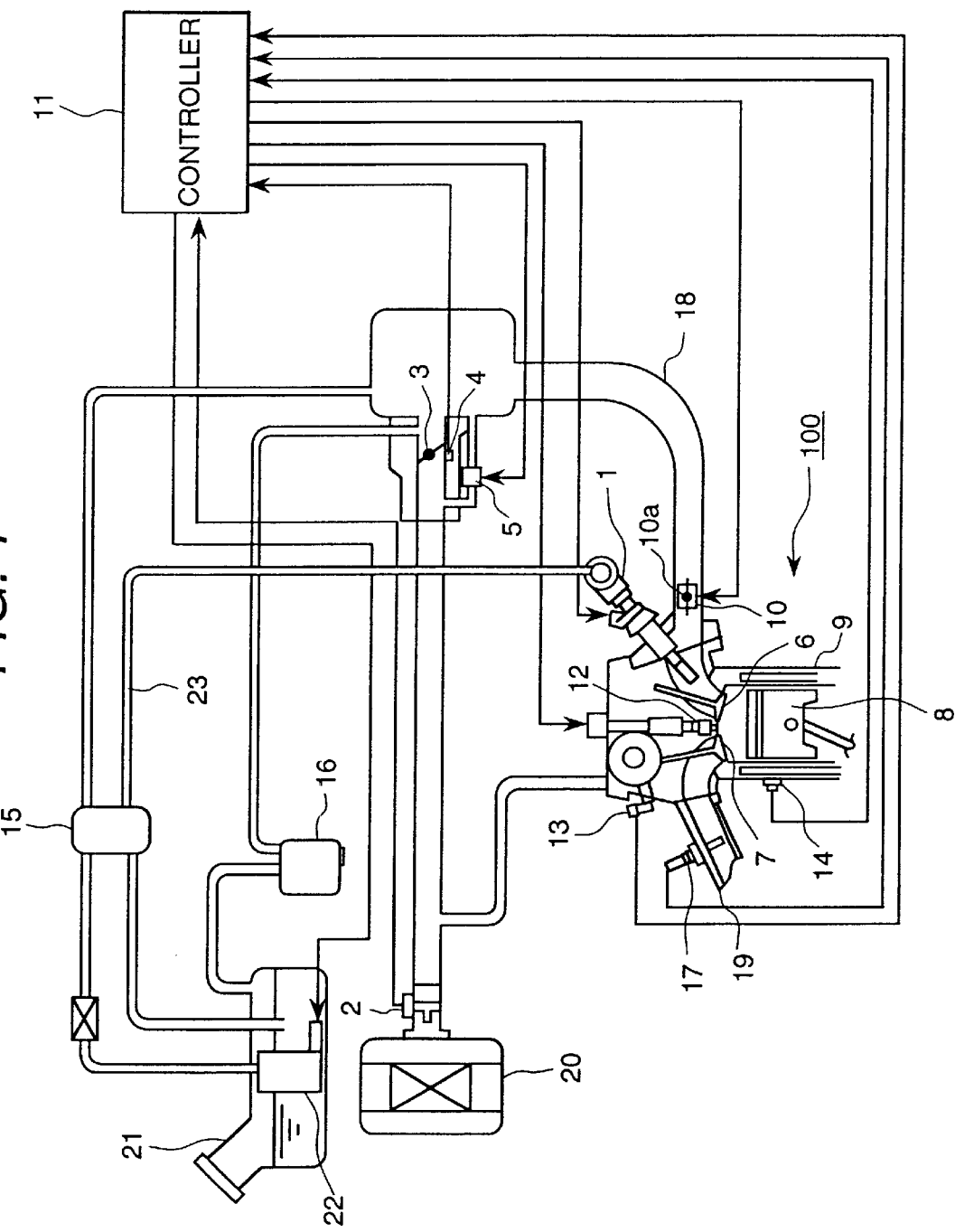
FIG. 1. is an entire structural diagram of an engine control system into which a control device according to the present invention is incorporated.

FIG. 1 shows an entire structural diagram of an engine control system provided with a control device 11 which is the subject of the present invention. In each of multi valve type cylinders 9, 9, . . . for an internal combustion engine 100 constituted by multi cylinders, an ignition plug 12 is disposed as well as a combustion chamber is constituted by an air intake valve 6, an exhaust valve 7 and a piston 8 reciprocating in the cylinder 9. Further, to each of the cylinders 9, 9, . . . an air intake duct 18 and an exhaust duct 19 which are respectively opened and closed by the air intake valve 6 and the exhaust valve 7, and the air intake duct 18 is configured as a branched air intake duct having two air intake ports. Further, in the air intake duct 18 an intake air sensor 2 for measuring intake air mass flow rate and a throttle sensor 4 for measuring opening degree of a throttle valve 3 are respectively disposed at proper positions therein. Still further, a cooling water temperature sensor 14 for measuring engine cooling water temperature and a crank angle sensor 13 for measuring engine rpm are respectively disposed at proper positions of the internal combustion engine 100.

Air introduced from an air cleaner 20 disposed at the upstream of the air intake duct 18 is, after the flow rate thereof being adjusted by the throttle valve 3, mixed with gasoline injected from a fuel injection valve (injector) 1 with a predetermined angle, and is supplied to the respective cylinders 9, 9, . . . At the upstream of each of the cylinders 9, 9, . . . for the internal combustion engine 100 the injector 1 is disposed so as to constitute the multi point injection (MPI) system fuel supply.

On the other hand, the fuel from a fuel tank 21, after being sucked and pressurized by a fuel pump 22, passes through a fuel pipe 23 provided with a pressure regulator 15, is introduced to a fuel inlet of the injector 1 and, at the same time, excess fuel is returned to the fuel tank 21. Further, discharge of fuel evaporating from the fuel tank 21 into atmosphere is suppressed by a canister 16.

Exhaust gas of the fuel burned in the respective cylinders 9, 9, . . . is introduced to a catalysis converter (not shown) through the exhaust gas duct 19 and is exhausted after being cleaned. At a proper position in the exhaust gas duct 19 an air fuel ratio sensor 17 is disposed which outputs linear air fuel ratio signals which are proportional to oxygen density in the exhaust gas in a broad range.

The output signals representing intake air amount obtained from the intake air sensor 2, the output signals from the throttle sensor 4 and the respective output signals from such as the cooling water temperature sensor 14, the crank angle sensor 13 and the air fuel ratio sensor 17 are inputted to a control device (control unit) 11.

The control unit 11 is disposed either in a vehicle body or in an engine room, performs predetermined arithmetic operation processes based on electrical signals outputted from the variety of sensors and representing driving conditions of the internal combustion engine 100 and outputs, in order to perform an optimum control for the respective driving conditions, respective signals which open and close the injectors 1 injecting and supplying fuel, drive the ignition plugs 12 and further open and close an idle speed control (ISC) valve 5 which controls the engine rpm during idling so as to assume a target rpm as well as controls other than the fuel pump 22 a swirl control valve driving means 10. Further, the control unit 11 controls the fuel injection for every cylinder 9, 9, . . . while matching the timing of fuel injection from the respective injectors 1 with the air intake stroke of the respective cylinders 9, 9, . . .

Further, the control unit 11 is constituted by such as an I/O functioning as an input and output interface, an arithmetic operation processing unit MPU, a memory unit RAM and ROM in which many control programs and data are stored and a timer counter.

More specifically, a fuel injection amount setting means (not shown) calculates a demand fuel amount to be supplied from a concerned injector 1 to the corresponding cylinder 9 based on the detected intake air amount and a set air fuel ratio, performs an arithmetic operation of a demand injection pulse width (valve open time span of the injector 1) based on the calculated demand fuel amount and a flow rate gradient and a invalid injection pulse width representing an injection characteristics of the injector 1, and opens the valve for the time corresponding to the injection pulse based on the determined demand injection pulse width. Further, a fuel injection time setting means (not shown) performs an arithmetic operation of the injection time of the injector based on such as the intake air amount and the engine rpm and synchronizes the same with the air intake stroke of the internal combustion engine 100 as well as sets the fuel injection time during the air intake stroke at an optimum timing which will be explained later, and outputs drive signals based on the set timing, other than to the injector 1 and the ignition plug 12, to an actuator referred to as the swirl control valve drive means 10. Further, in order to enhance a robust property of the engine control system, the control unit 11 is further provided with a revolution fluctuation index arithmetic operation means (not shown) which performs an arithmetic operation of a revolution fluctuation index representing a combustion stability of the internal combustion engine which will be explained later.

The swirl control valve drive means 10 opens and closes a swirl control valve 10a which functions as an air flow velocity accelerating means for generating a tumble flow (tumbled swirl) and is disposed at the upstream of the injector 1. The swirl control valve 10a narrows the passage cross section of the air intake duct 18 by driving the same toward closing direction and increases the air flow velocity by the tumble flow (tumbled swirl), thereby, the fuel deposited on the wall face of such as the air intake duct 18 is reduced as well as transportation of the fuel injected from the injector 1 to the cylinder 9 is accelerated which will also be explained later.

An improvement of combustion in an internal combustion engine with the above referred to injectors 1 according to the present invention while forming an optimum air fuel mixture under the MPI system is achieved firstly by eliminating a time delay until the injected fuel is supplied into the cylinder 9 and secondly by enhancing the quality and spatial formation of the air fuel mixture in the cylinder 9.

The firstly indicated time delay until the injected fuel is supplied into the cylinder 9 is constituted (1) by a transportation delay of the injected fuel after the fuel is injected from the injector 1 until the fuel is actually sucked into the cylinder 9 and (2) by a calculation and process delay until the time after the demand fuel amount is calculated based on such as the intake air amount detected by the intake air sensor 2 and the fuel is actually injected from the injector 1. Then, in order to eliminate the transportation time delay of the injected fuel, it is required to inject fuel based on the latest data from the intake air sensor 2 and in synchronism with the air intake stroke of the cylinder 9 and to be sucked all of the fuel injected from the injector 1 into the cylinder during the air intake stroke.

Accordingly, in order to achieve the above requirements, it is necessary to complete the fuel injection from the injector at a predetermined timing within the air intake stroke of the cylinder 9. Namely, it is necessary that all of the fuel injected from the injector 1 has to be sucked into the cylinder 9 within a short period from the opening of the air intake valve 6 to the closing thereof, in this instance in view of the fuel injection time (injection pulse width) the injector 1 has to inject more fuel amount (the demand fuel amount) than usual in a shorter period than usual.

Figure 2:
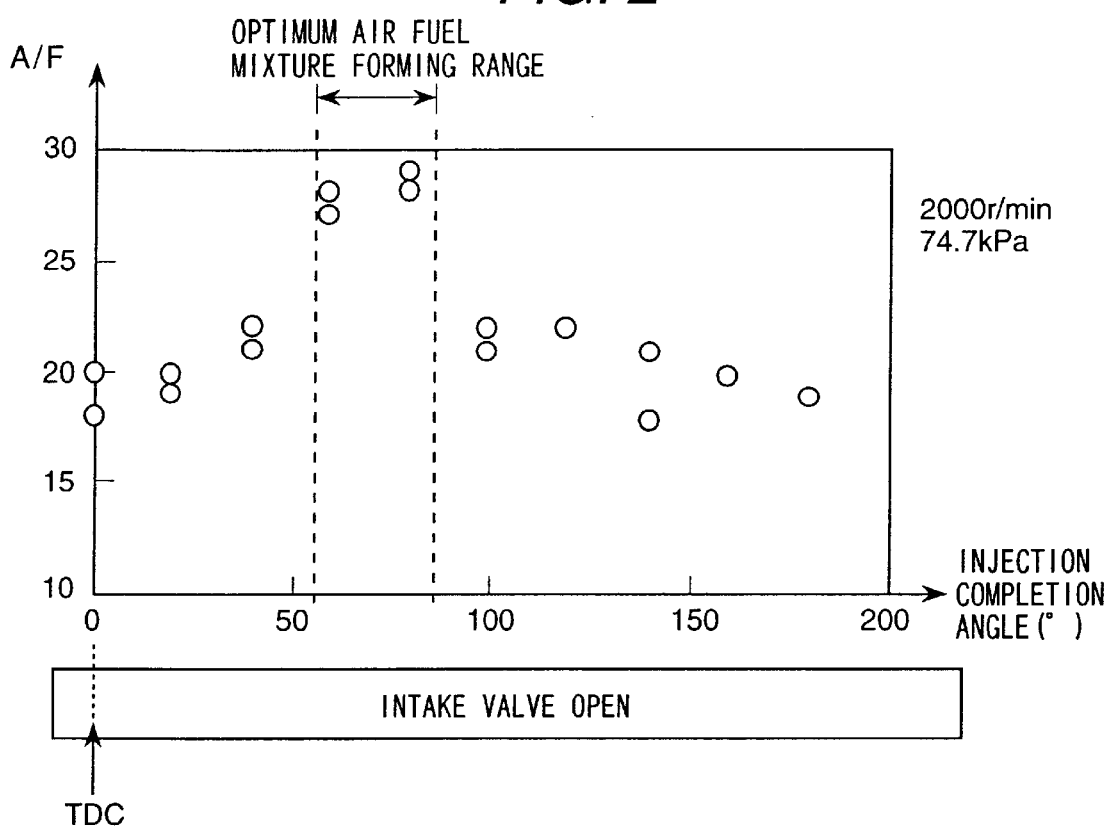
FIG. 2 is a diagram illustrating a relationship between fuel injection completion angle and lean burn limit in the control device as shown in FIG. 1.

FIG. 2 shows a relationship between fuel injection completion angle within the air intake stroke of the cylinder under a predetermined driving condition and lean burn limit while increasing fuel injection amount by the injector as a precondition of injecting the demand fuel amount in the short period, and the lean burn limit is determined by evaluating exhaust amount of hydro carbon (HC) and revolution fluctuation of the engine. As seen from FIG. 2, it will be understood that an optimum air fuel mixture forming range is obtained which extends the lean burn limit from air fuel ratio of about 22 to near 29 in a predetermined range of fuel injection completion angle, and an improvement of combustion in the internal combustion engine 100 by means of the lean burn can be achieved even if the fuel injection amount is increased.

Herein, the increase of the fuel injection amount of the injector 1 can be achieved (1) by enlarging the diameter of an injection port of the injector 1 (2) by increasing pressure of the fuel and (3) by driving the valve body of the injector 1 in high speed.

Among these three measures, with regard to the measures (1) and (2) which simply increases the injection amount, a further study is necessary for the use thereof, because if the demand injection amount is not satisfied during a flow rate at the side of low injection pulse at the time of idling and of deceleration, a problem of moving the air fuel ratio into an over rich is caused.

Accordingly, in the present invention, through the provision of means for driving the valve body of the injector 1 in high speed representing the measure (3) which will be explained later, it is facilitated to achieve the short period injection of the demand fuel amount within the air intake stroke and the improvement of the combustion for the internal combustion engine 100 is achieved by eliminating the time delay. Further, when the valve body is driven in high speed, the atomization of the fuel is enhanced from the early stage of the valve opening.

Now, secondly indicated enhancement of quality and formation of the air fuel mixture in the cylinder 9 is achieved on one hand by making the air fuel mixture lean and on the other hand by concentrating a flammable rich air fuel mixture only around the ignition plug 12, and the atomization of injected fuel droplet diameter is one of effective measures therefor. On the other hand, the atomized injected fuel has a small kinetic energy in comparison with the injected fuel having a usual droplet diameter and takes time for arriving into the cylinder 9 which causes time delay, therefore, in the present invention, the atomization of fuel injected from the injector 1 is enhanced as well as the injection port of the injector 1 is forwarded to the side of the air intake valve 6 and further the injection port is disposed at the accelerated air flow portion or near the accelerated air flow portion formed by the swirl control valve 10a which will be explained later, thereby, the above referred to time delay is eliminated, for example, even if there are restrictions with regard to the nozzle elongation of the injector 1 or the attachment position thereof. Further, in association with the fuel injection time setting means an injection timing for forming an optimum air fuel mixture is set among the fuel injection time within the air intake stroke and the flammable rich air fuel mixture is gathered only around the ignition plug 12, thereby, an enhancement of quality and formation of the air fuel mixture in the cylinder is realized.

Figure 3A:
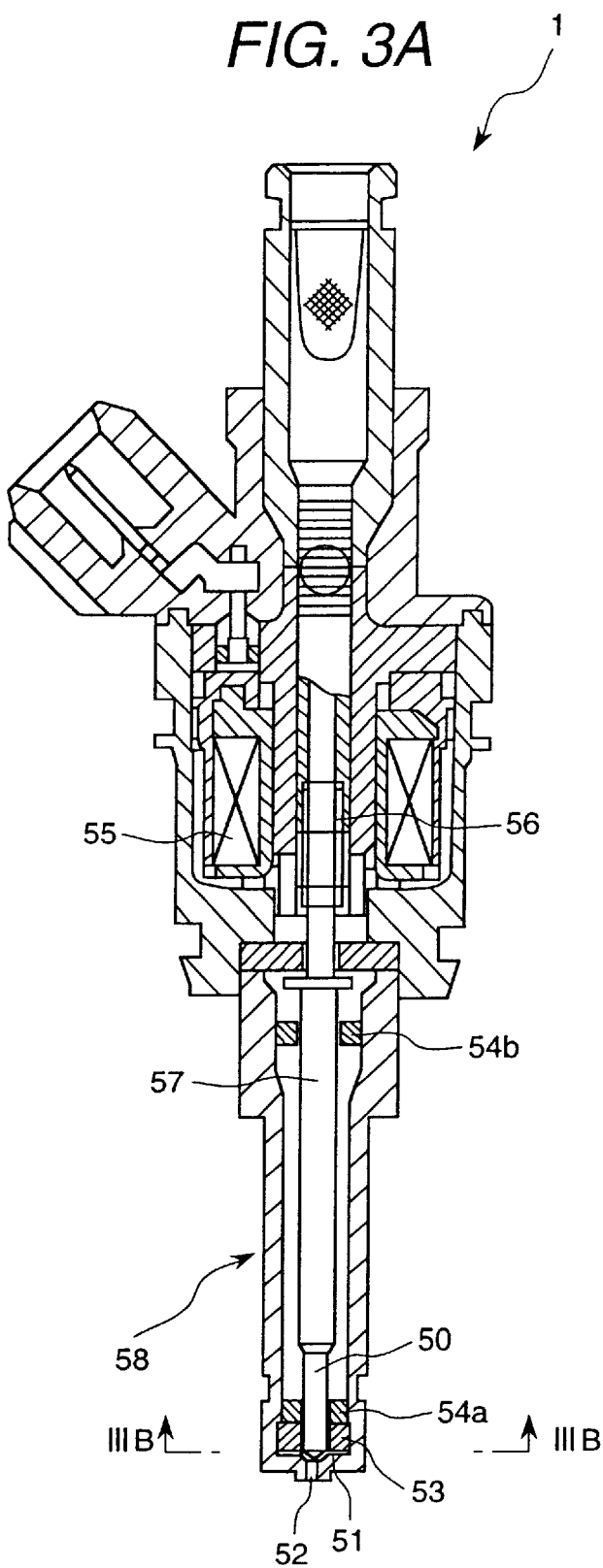
FIG. 3A is a vertical cross sectional view of a fuel injection valve as included in FIG. 1.

FIG. 3A is a vertical cross sectional view of the injector 1, and the injector 1 is constituted as a usual solenoid type injection valve and is constituted by such as a valve body 50, a swirler (fuel swirling element) 53 functioning as one of fuel atomizing means, a solenoid coil 55, a valve close biasing spring 56, a plunger rod 57 and a valve main body 58 including an injection port 52 and a valve seat face 51.

When a current is flown through the solenoid coil 55 based on the drive signals from the control unit 11, the plunger rod 57 is attracted and moves between valve body guide portions 54a and 54b, and the valve body 50 integral with the plunger rod 57 leaves from the valve seat face 51 and opens the injection port 52.

Figure 3B:
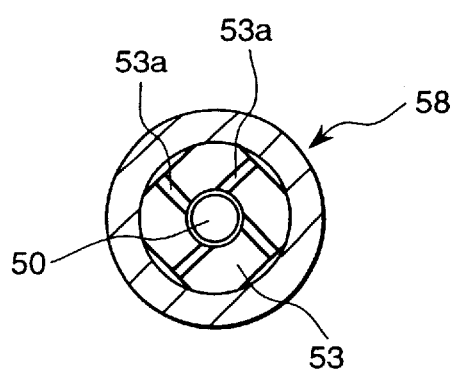
FIG. 3B is a cross sectional view taken along a line IIIB—IIIB in FIG. 3A.

As illustrated in FIG. 3B, the swirler 53 is provided at the bottom face side thereof with four fuel swirling grooves 53a, . . . directing to the valve body 50, and the respective opposing fuel swirl grooves 53a are arranged so as not to locate on a same straight line and further the respective fuel swirling grooves 53a are extended so as to incline toward the valve body 50.

Figure 19:
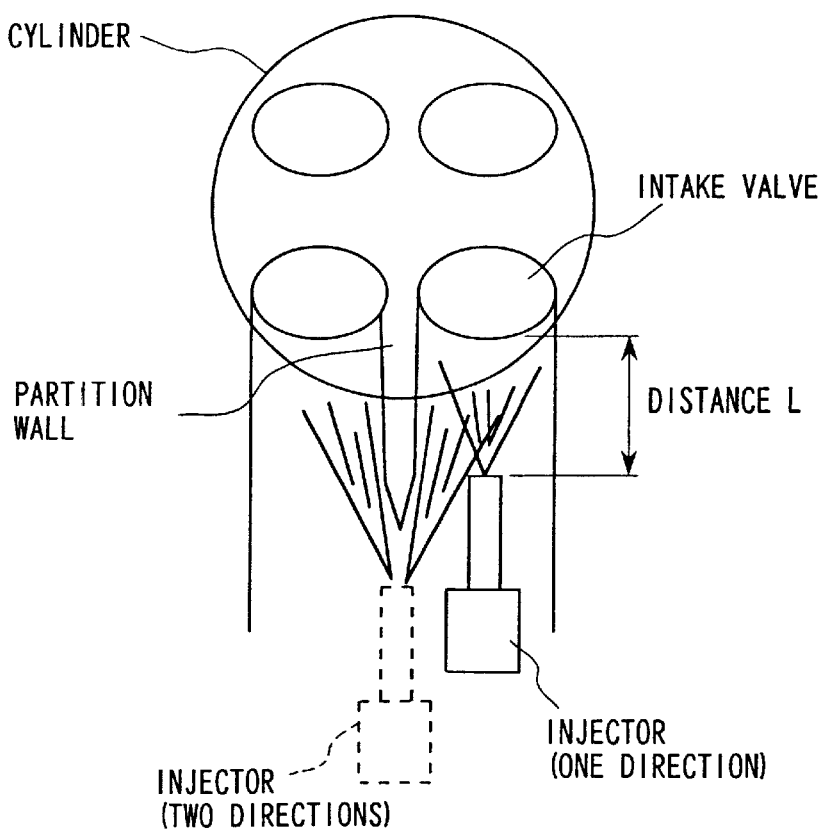
FIG. 19 is a diagram illustrating an example when another fuel injection valve is attached to an air intake duct as a comparison.

The fuel in the injector 1 which passes through the valve body 58 passes the fuel swirling grooves 53a, . . . , swirls toward the injection port 52 and, after being atomized, is injected toward the cylinder 9 in two directions as illustrated in FIG. 19, thereby, atomization of injected fuel droplet diameter is achieved from the early valve open stage of the valve body 50. On the other hand, when the current supply is interrupted, the plunger rod 57 is moved by the biassing force of the valve close biassing spring 56, the valve body 50 contacts the valve seat face 51 and the injection port 52 is closed.

Further, in addition to the atomization by the swirler 53, in the injector 1, the attraction force of the solenoid coil 55 is increased so as to drive the valve body 50 in opening direction in high speed as well as the valve close biasing spring 56 is strengthened so as to drive the valve body 50 in closing direction in high speed, thereby, the pressure in the injector 1 and the opening cross section at the injection port 52 can be obtained in a short period by the high speed drive of the valve body 50, thereby, the short period injection in which more amount of fuel (the demand fuel amount) than the usual is injected in a shorter period than the usual and the enhancement of atomization of fuel from the early valve open stage are realized. This is because that when the valve body 50 is driven in high speed, the lift speed of the valve body 50 is accelerated, thereby, the passage volume of the fuel swirling grooves 53a in depth direction is obtained in a short period and a strong swirling flow passing through the fuel swirling grooves 53a and necessary for the atomization is obtained in a shorter time than the usual.

Figure 4:
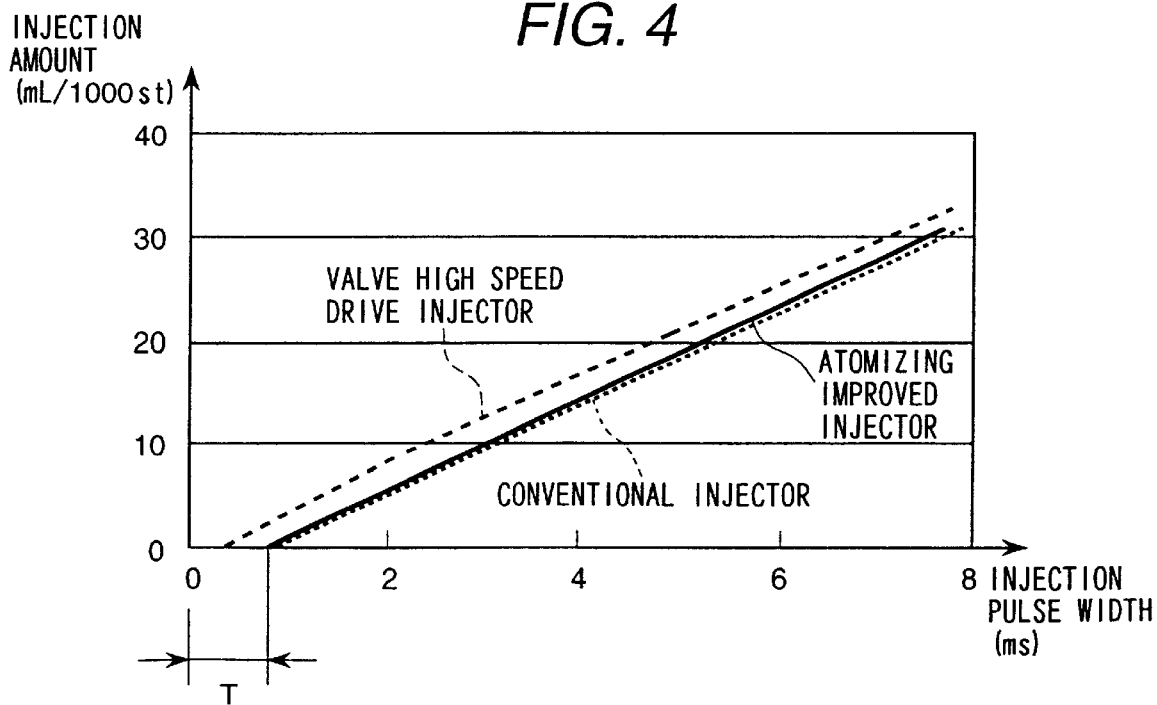
FIG. 4 is a diagram illustrating a relationship between injection pulse width of the fuel injection valve as shown in FIGS. 3A and 3B and dynamic fuel injection amount by 1000 time injections.
Figure 5:
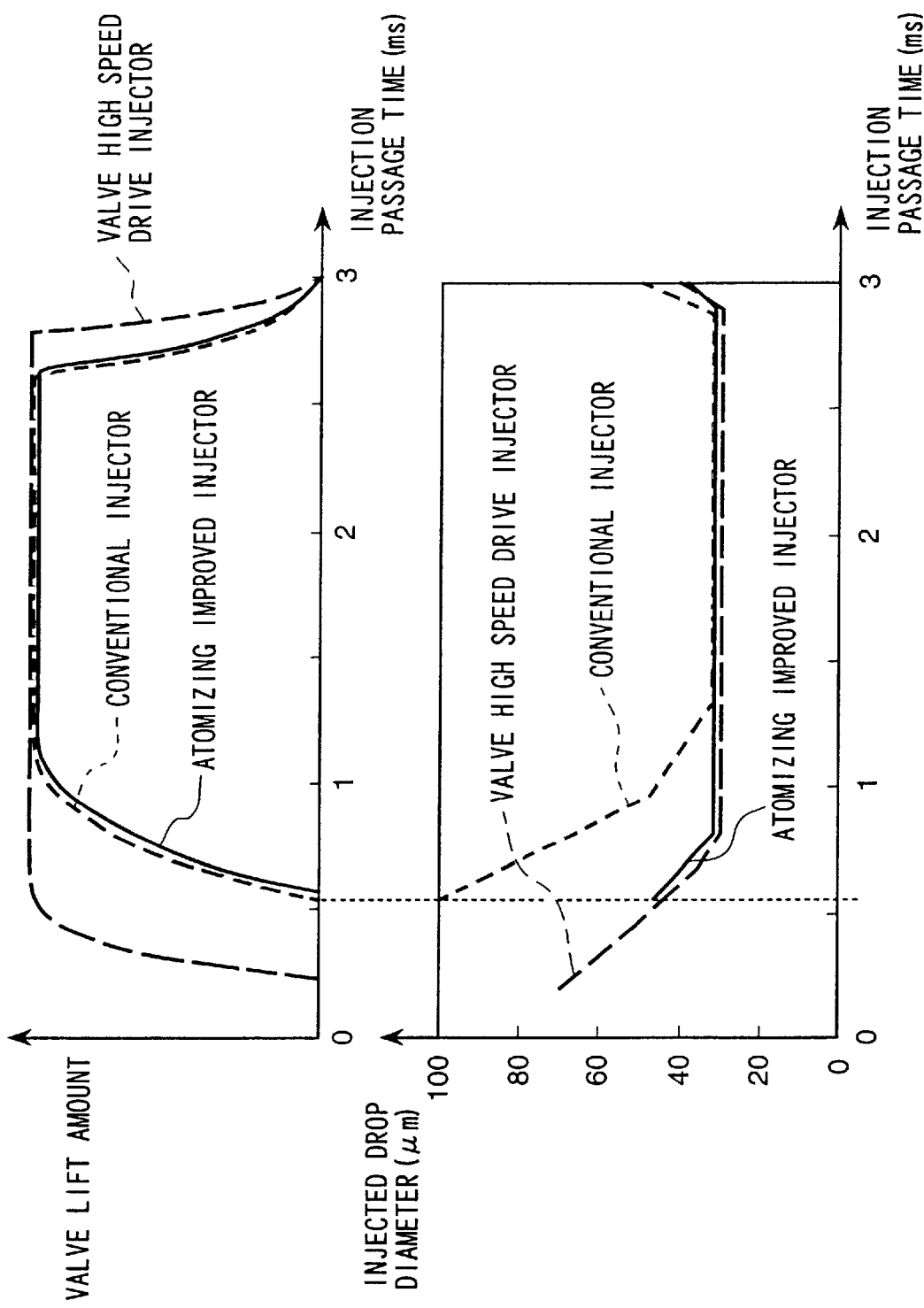
FIG. 5 is a diagram illustrating a relationship between injection passage time and valve body lift amount and injected fuel droplet diameter.

FIGS. 4 through 10 show fuel injection amount characteristics of the injector 1, and FIG. 4 shows a relationship between injection pulse width and dynamic fuel injection amount obtained by 1000 time injection, FIG. 5 shows a relationship between injection passage time, lift amount of the valve body 50 and droplet diameter of injected fuel, and FIG. 6 shows distribution of droplet diameter of the injected fuel.

As illustrated in FIG. 4, with the injector 1 which drives the valve body 50 in high speed (as shown in a broken, line) an invalid injection pulse width T is shorten from about 0.6 ms to about 0.2 ms while maintaining the flow rate gradient and dynamic fuel injection amount is increased without changing the static flow rate in comparison with a conventional injector (as shown in a dotted line) and an atomization improved injector with a swirler 53 but of which valve body 50 is not driven in high speed (as shown in a solid line).

The excellency with regard to the invalid injection pulse width T and the dynamic fuel injection amount of the injector 1 which drives the valve body 50 in high speed in comparison with the conventional injector is further proved by the facts as illustrated in FIG. 5 that the rising time of the valve body 50 for the injector 1 which drives the valve body 50 in high speed (as shown in a broken line) is shortened in comparison with the conventional injector (as shown in a dotted line) as well as the time interval from the rising to the falling is elongated.

Further, with regard to droplet diameter with respect to injection passage time for the injector 1 which drives the valve body 50 in high speed (as shown in a broken line), the conventional injector (as shown in a dotted line) and the atomization improved injector in which the droplet diameter of the injected fuel is atomized from the early open stage of the valve body 50 through improvement of the swirler 53, all of their average droplet diameters defined by Sauter's Mean Diameter (SMD) are about 30 μm as illustrated in FIG. 5. However, the droplet diameter in a predetermined time (for example, about 0.5 ms) from the injection start for the conventional injector shows about 100 μm. On the other hand, the droplet diameter for the valve body high speed drive injector 1 and the atomization improved injector shows below about 70 μm, in that the combination of the swirler 53 and high speed drive of the valve body 50 and the mere provision of swirler 53 contribute to atomize the injected fuel droplet diameter from the early open stage of the valve body 50. Further, as illustrated in FIG. 6, with the valve body high speed drive injector 1 and the atomization improved injector the droplet diameter of about 30 μm occupies the major portion in comparison with the conventional injector, which shows that the injected droplet diameter is further uniformalized.

Figure 8:
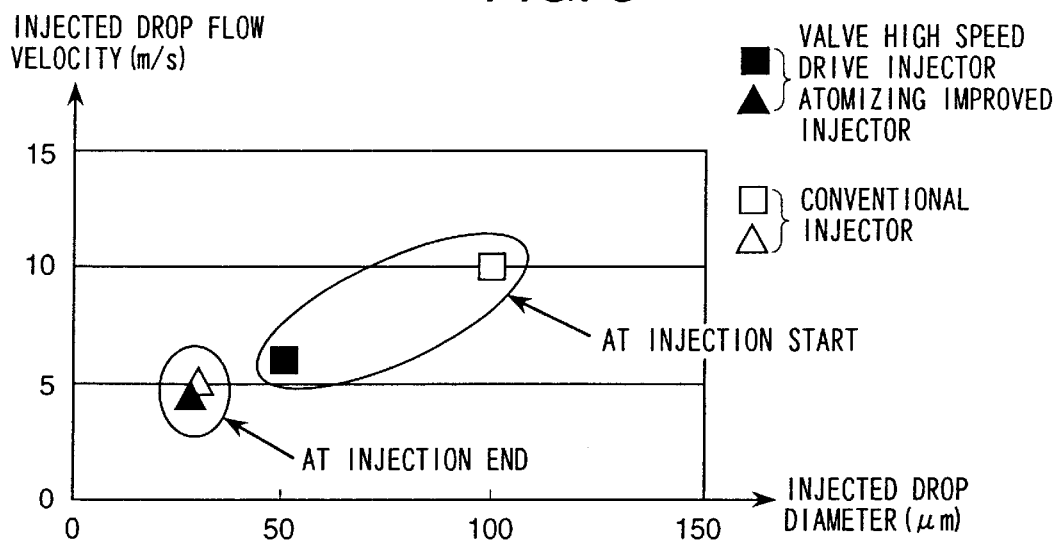
FIG. 8 is a diagram illustrating a relationship between injected fuel droplet diameter and injected fuel droplet flow velocity at the time of injection start and of injection completion in connection with the fuel injection valve as shown in FIGS. 3A and 3B and the conventional fuel injection valve.

On the other hand, as will be understood from the relationship between injected droplet diameter and the injected droplet flow velocity as illustrated in FIGS. 7 and 8, when the air flow velocity in the air intake duct 18 is constant, the injected fuel flow velocity decreases as the injected fuel droplet diameter decreases (see FIG. 7), namely, the injected fuel flow velocity at injection start for the valve body high speed drive injector 1 and the atomization improved injector is about 6 m/s which is lower than the injected fuel flow velocity at injection start of 10 m/s for the conventional injector (see FIG. 8). This tendency is influential, in particular, when the air flow velocity in the air intake duct 18 is low and the arrival time of the injected droplet is affected by the flow velocity of the injected droplet itself rather than the air flow velocity, the injected droplet arrival time for the injector 1 is prolonged than that for the conventional injector as will be understood from a relationship between injected droplet arrival time, distance from injection point and equivalent crank angle. More specifically, when a straight distance (distance from the injection point) from the injection point corresponding to the injection port 52 is 90 mm, with the conventional injector having the injected droplet flow velocity at injection start of 10 m/s, the injected droplet arrival time is about 9 ms, on the other hand, with the injector 1 having the injected droplet flow velocity of 5 m/s, the injected droplet arrival time is about 8 ms. The substantially the same relationship between injected droplet arrival time and equivalent crank angle with respect to a same engine rpm stands as illustrated at the bottom part in FIG. 9.

Accordingly, in addition to the provision of the swirler 52 and the high speed drive of the valve body 50, when the injector 1 is disposed so that the straight distance from the injection port 52 to the air intake valve 6 is shortened into about half of that of the conventional injector, such will lead to an elimination of the transportation delay of the injected fuel. Therefore, the injector 1 according to the present embodiment is designed to elongate the valve body 50 as one of means for shortening the distance between the cylinder 9 and the injection port 52. Further, as illustrated in FIG. 8, since differences in the injected droplet flow velocities at injection start and injection completion for the injector 1 are small in comparison with the injected droplet flow velocities at injection start and at injection completion, through substantially the same correction control from the injection start to the injection completion the time delay including the transportation delay of the injected fuel can be eliminated, thereby, the control thereof is simplified in comparison with the control of the conventional injector which requires a non-linear correction from the injection start to the injection completion.

Figure 10:
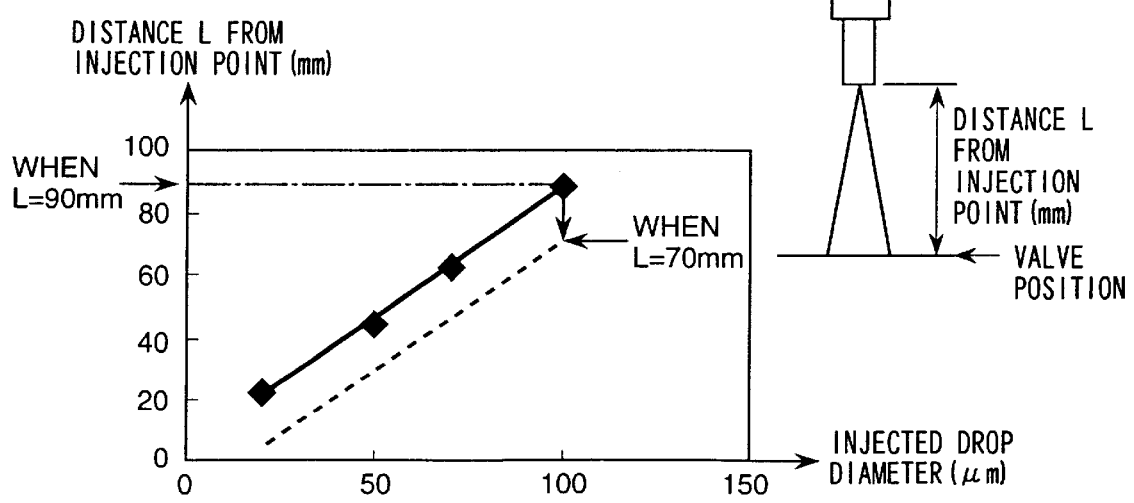
FIG. 10 is a diagram illustrating a relationship between injected fuel droplet diameter and distance from injection point obtained by the fuel injection valve as shown in FIGS. 3A and 3B.
Figure 9:
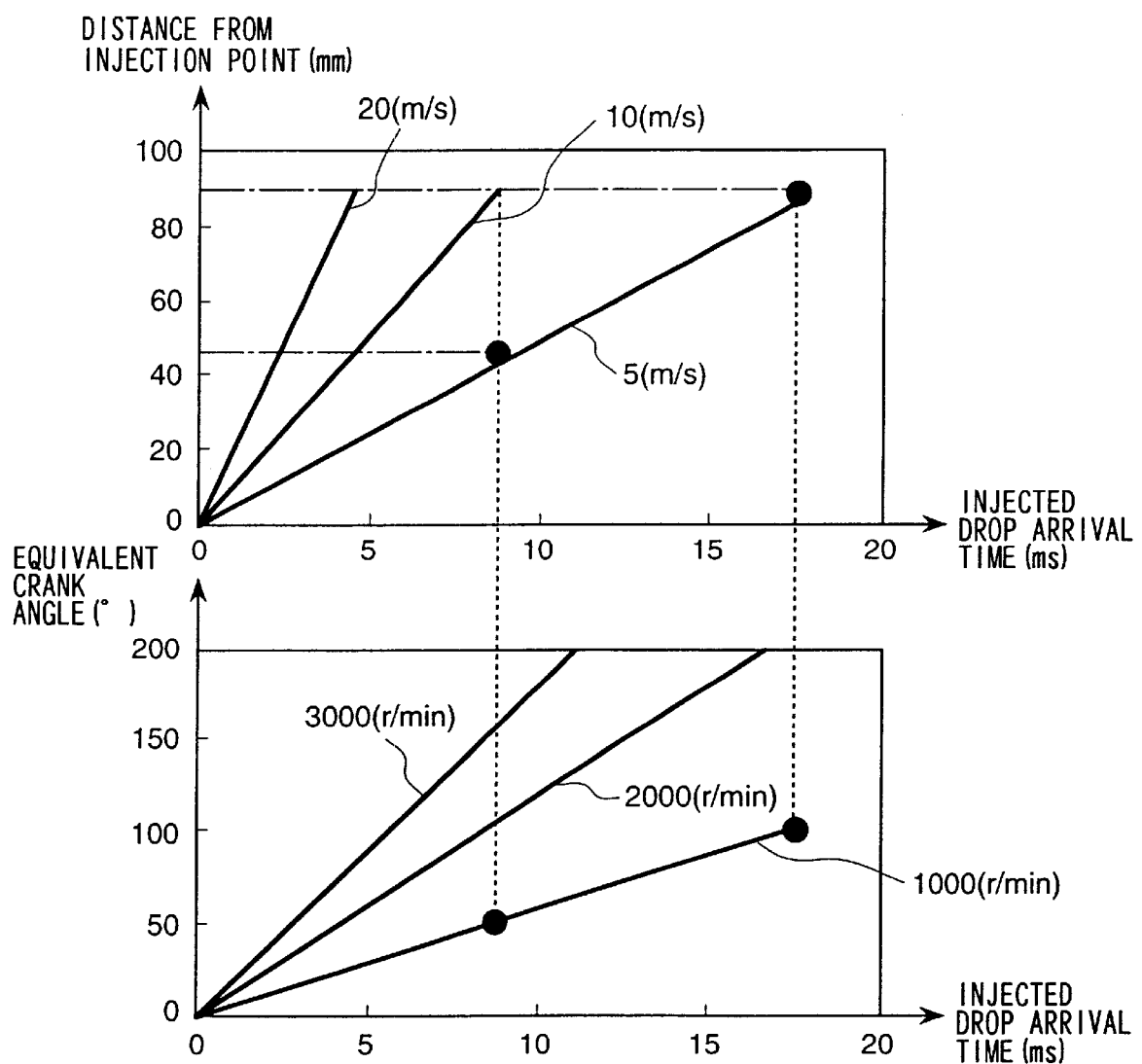
FIG. 9 is a diagram illustrating a relationship between injected fuel droplet arrival time, distance from injection point and equivalent crank angle thereof obtained by the fuel injection valve as shown in FIGS. 3A and 3B.

Further, as illustrated in FIG. 10, the distance L from the injection point representing a straight distance from the injection port 52 to the air intake valve 6 can be set based on the droplet diameter of the injected fuel. However, in view of a variety of driving regions, although in a driving region of such as comparatively low engine rpm and low load, the injected droplet arrival time is affected by the flow velocity of the injected droplet itself rather than the air flow velocity, the distance L can be set as indicated above, however, in other driving regions there arise restrictions in connection with the structure of the injector and the attachment position thereof. For example, the elongation of the injector 1 is limited upto about 30~50 mm, even if such as a guide member is introduced so as to reduce a play during the movement of the elongated valve body 50 while maintaining the flow rate accuracy in the same level as the conventional injector. Further, if the attachment position of an injector can be moved close to the head side of the cylinder 9, it will be possible to eliminate the restriction of the nozzle elongation, however, at the head side of the cylinder 9 there are problems such as interference with the sliding portion of the cylinder 9 and with structural members around the cylinder 9, therefore, a particular structure for solving the problem is required which causes another problem of rising the production cost therefor.

Therefore, the injector 1 according to the present embodiment makes use of the swirl control valve 10a as a means for increasing flow velocity of the injected fuel while maintaining the attachment position of the injector 1 with respect to the air intake duct 18 at the conventional position, thereby, the time delay of the injected fuel is resolved.

Figure 11A:
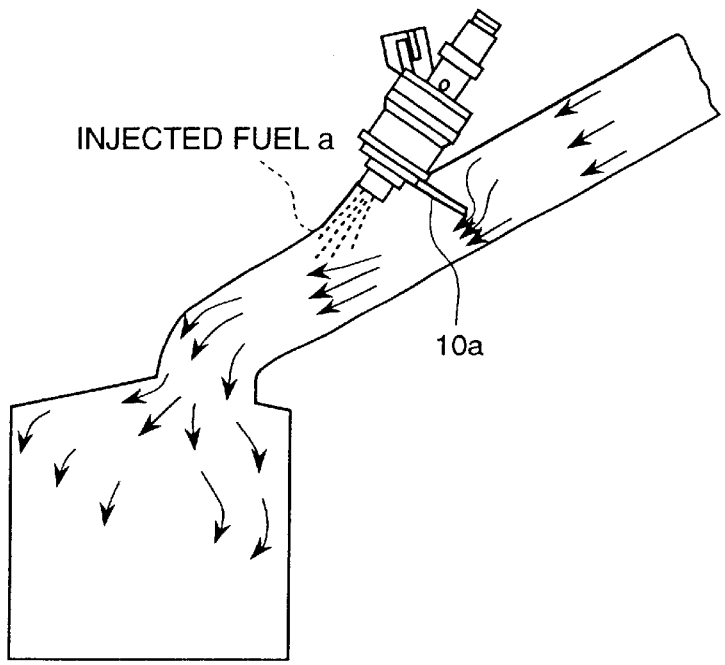
FIG. 11A is a simulation diagram of air flow velocity when a swirl control valve is introduced in an air intake duct provided with a conventional fuel injection valve.
Figure 11B:
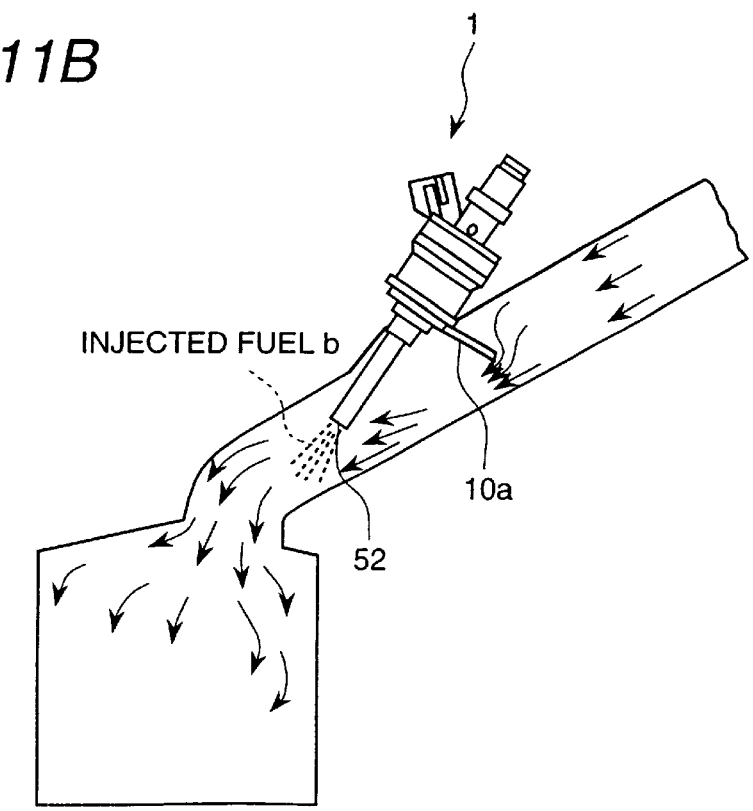
FIG. 11B is a simulation diagram of air flow velocity when a swirl control valve is introduced in an air intake duct provided with the fuel injection valve as shown in FIGS. 3A and 3B.

FIGS. 11A and 11B are diagrams illustrating simulation results of air flow (air flow velocity) when the swirl control valve 10a is disposed in the air intake duct 18.

As illustrated in FIG. 11A, the injection port of the conventional injector is positioned at a low air flow velocity area remote from the swirl flow, therefore, the injected droplet "a" hardly rides on the swirl flow. On the other hand, as illustrated in FIG. 11B, the injection port 52 of the injector 1 according to the present embodiment is positioned at or near a high air flow velocity area caused by the swirl flow, therefore, almost all the injected droplet "b" can ride on the swirl flow. Accordingly, it will be understood that even if the distance L from the injection point is remote from an ideal position, the time delay of the injected fuel can be resolved.

Figure 12A:
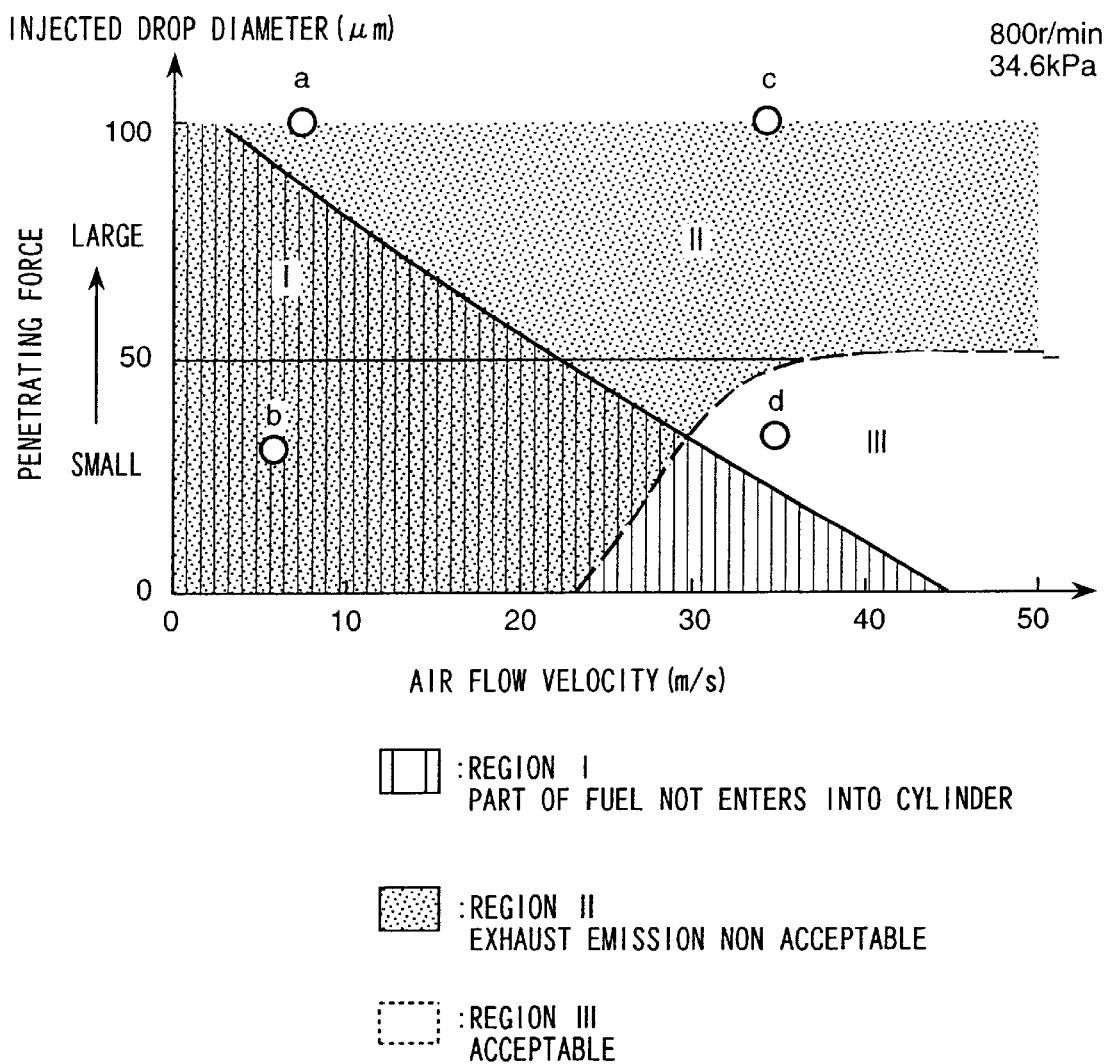
FIG. 12A is a diagram illustrating acceptable and non acceptable regions with regard to complete entry of the injected fuel into a cylinder and satisfaction of a required exhaust gas property in view of the relationship between injected fuel droplet diameter and air flow velocity of the fuel injection valve as shown in FIGS. 3A and 3B.
Figure 12B:
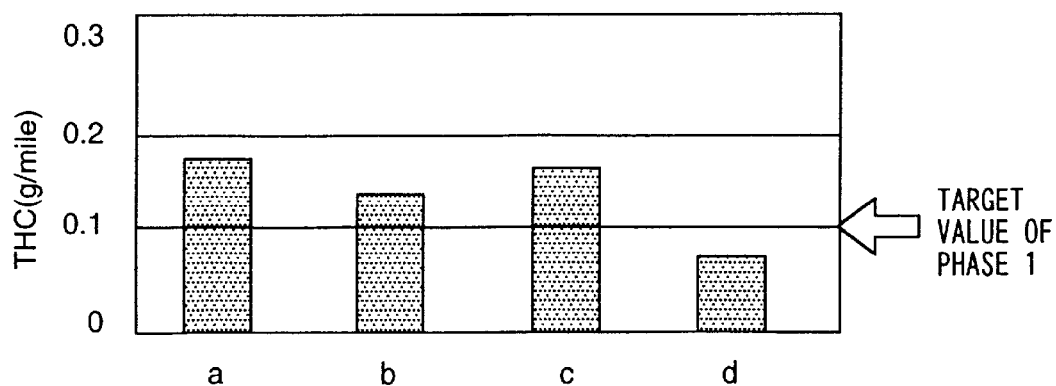
FIG. 12B is a diagram illustrating total HC emission for four states a, b, c and d of the injected fuel droplets as shown in FIG. 12A with reference to a target valve of phase 1.

Further, FIG. 12A illustrates a relationship between injected droplet diameter and air flow velocity, and shows a region where all of the injected fuel is sucked in the cylinder 9 during the air intake stroke and a region where the exhaust gas property satisfies the required property under a predetermined driving condition (for example, engine rpm 800 r/min, engine load 34.6 kPa) and when the injector 1 with the elongated nozzle is disposed at a predetermined position.

Herein, when assuming point a for the conventional injector where the injected droplet diameter is large in that the penetration force thereof is large and the air flow velocity is low (for example, air flow velocity under a usual condition) and point c for the conventional injector where the injected droplet diameter is large, in that the penetration force thereof is large and the air flow velocity is high (the air flow velocity is increased, for example, through the provision of such as the swirl control valve), and point c for the injector 1 wherein the injected droplet diameter is small, in that the penetration force thereof is small and the air flow velocity is low and point d for the injector 1 where the injected droplet diameter is small, in that the penetration force thereof is small and the air flow velocity is high, the above relationship between the injected droplet diameter and air flow velocity can be classified into three regions as illustrated in FIG. 12A, in that region I where all of the injected fuel can not be sucked into the cylinder 9 during the air intake stroke, region II the exhaust gas property does not satisfy the required property and region III where all of the injected fuel is sucked into the cylinder 9 during the air intake stroke and the exhaust gas property satisfies the required property.

At first, with regard to region I whether all of the injected fuel is sucked into the cylinder 9 during the air intake stroke is controlled by the flow velocity of the injected droplet by itself rather than the air flow velocity, when the injected droplet diameter is large, on the other hand when the injected droplet diameter is small, controlled by the air flow velocity, because the flow velocity of the injected droplet is lowered, therefore, a substantially anti-proportional border line is determined for the region I.

On the other hand, with regard to the region II, when the exhaust gas properties of the points a, b, c and d are compared with respect to, for example, the total HC emission amount in view of, for example, phase I in North American Exhaust Gas Measurement Mode, the points a and c can satisfy the target HC emission amount 0.2 (g/mile) for the conventional LEV regulation, however, another target HC emission amount 0.1 (g/mile) for the further strict ULEV regulation can only be satisfied by the injected droplet diameter and the air flow velocity defining the point d. Therefore, when the injected droplet diameter is small and the flow velocity thereof shows little influence, the required performance can not be achieved if the injected droplet is ridden on the air flow. In view of the above, the border line of region II is determined.

Accordingly, when the flow velocity of the injected fuel is controlled by the air flow velocity rather than the flow velocity of the injected droplet itself, in order to satisfy the required exhaust gas property the injection port 52 of the injector 1 is forwarded to the side of the air intake valve 6 and the injection port 52 is disposed at or near the accelerated air flow area formed by the swirl control valve 10a representing the air flow velocity accelerating means, thereby, the time delay of the injected droplet arrival is eliminated, because the time delay until all of the injected fuel is supplied into the cylinder 9 can not necessarily be compensated by shortening the straight distance from the injection port 52 to the air intake valve 6.

Now, how the quality and formation of the air fuel mixture in the cylinder 9 is enhanced by the fuel injection time setting means will be explained.

The fuel injection time setting means according to the present embodiment causes to effect the fuel injection in synchronism with the air intake stroke so as to eliminate the time delay as well as performs an arithmetic operation of a demand injection pulse width T1out based on the demand fuel amount determined by the intake air amount and the air fuel ratio and the injection amount characteristics of the injector 1, subtracts the demand injection pulse width T1out from a time interval T1end between a reference signal angle θIJED which is generated at a predetermined position for every cylinder 9, 9, . . . and is detected by the crank angle sensor 13 and an injection completion angle θIJED which is set in advance by means of such as a map with variables such as engine rpm and engine load, and calculates a time interval θT1stt until the injection start from the reference signal angle θSTD, in that through a so called injection completion timing control the injection start is controlled so that an optimum air fuel mixture is formed with the fuel injection completion timing (angle). In addition, in order to form a further optimum air fuel mixture, setting of fuel injection time by the injector 1 is modified depending on the maximum value of the air flow velocity in the air intake duct 18 which will be explained hereinbelow.

Figure 13:
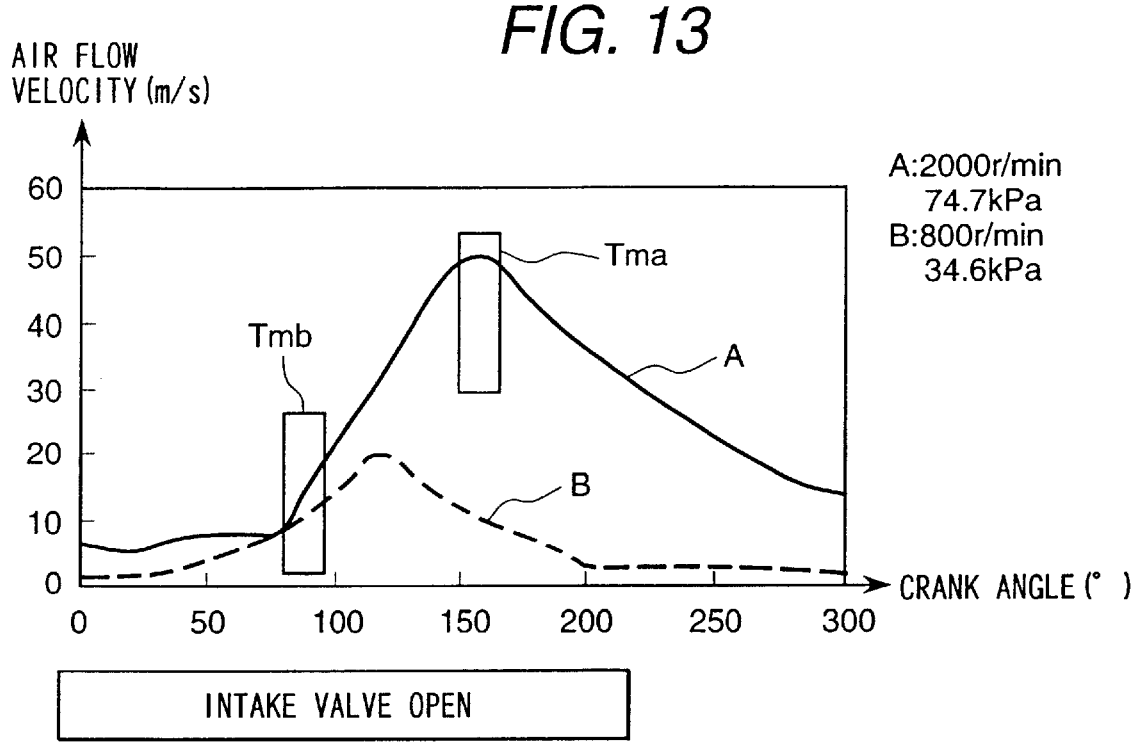
FIG. 13 is a diagram illustrating a relationship between crank angle and air flow velocity for a fuel injection time setting means in the control device as shown in FIG. 1.

FIG. 13 shows variation of air flow velocity during the air intake stroke by making use of a relationship between crank angle with reference to TDC near the start of air intake and air flow velocity, and a variation under a driving condition A of engine rpm 2000 r/min and engine load (air intake duct absolute pressure) 74.7 kPa is shown in a solid line and another variation under a driving condition B of engine rpm 800 r/min and engine load (air intake duct absolute pressure) 34.6 kPa is shown in a dotted line, wherein the subject engine is a 6 cylinder engine and the displacement thereof is 2 litter.

The distance of moving the injected fuel from the injector to around the ignition plug 12 is substantially constant, although slightly being affected by the engine rpm. On the other hand, the air flow velocity is affected by the engine rpm and the engine load, and when the engine rpm is high and the engine load is large, a larger maximum air flow velocity is obtained, therefore, the injection timing of the injector 1 is affected by the air flow velocity.

Accordingly, when the optimum air fuel mixture forming range is evaluated with reference to the fuel injection completion angle and the lean burn limit as illustrated in FIG. 2, an optimum value represented by fuel injection timing (angle) in the optimum air fuel mixture forming range appears, under the condition that the fuel injection is completed during the air intake stroke, at a time span Tma including the time when the maximum air flow velocity is detected, when the air flow velocity in the air intake port is high (for example, at the driving condition A of engine rpm 2000 r/min and engine load 74.6 kPa, the air flow velocity in the air intake port reaches to 40~50 m/s), and further, the optimum value appears at a time span Tmb which is earlier than the time when the maximum air flow velocity is detected, when the air flow velocity is low (for example, at the driving condition B of engine rpm 800 r/min and engine load 34.6 kPa, the air flow velocity is below 20 m/s) as will be seen from FIG. 13. Accordingly, under the driving condition B when the fuel is injected at a time when the maximum air flow velocity appears it will be understood that the optimum air fuel mixture forming range may not be generated, therefore, the fuel injection time setting means measures the maximum air flow velocity value based on the engine rpm and the engine load and modifies the setting of the fuel injection time with reference to a map in RAM and ROM of the control unit 11 and based on the maximum air flow velocity value.

Figure 14:
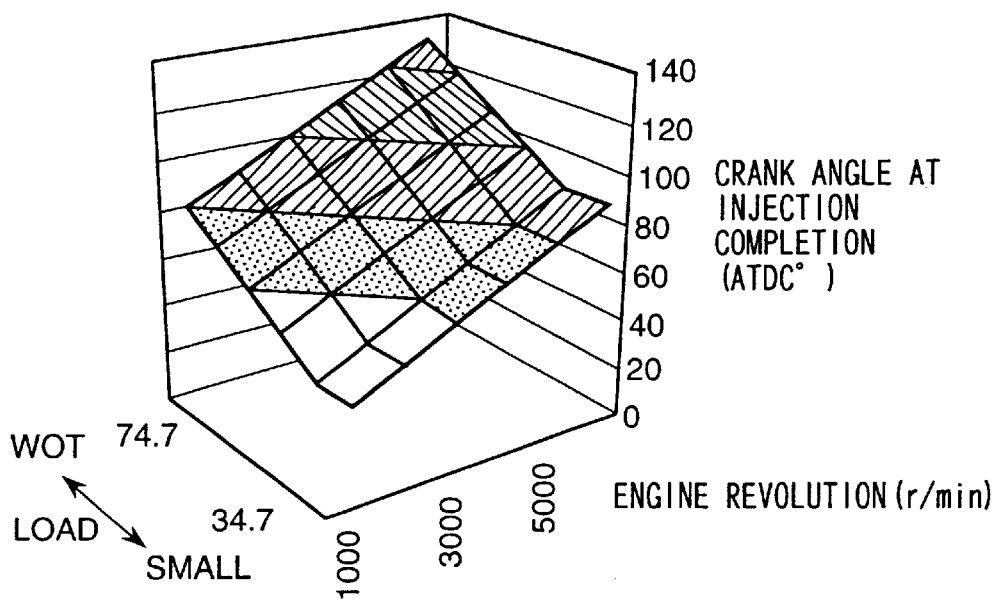
FIG. 14 is a three dimensional map for determining an optimum value of fuel injection completion timing for the fuel injection time setting means in the control device as shown in FIG. 1.

FIG. 14 is a three dimensional map with which the optimum value for the fuel injection timing is determined in the fuel injection time setting means based on the engine rpm and the engine load, and in the map the fuel injection completion crank angles representing the optimum values are set in advance based on the engine rpm and the engine load. Further, in the present embodiment the setting is determined under the condition that the open and close timing of the air intake valve 6 is not varied, however, when the open and close timing of the air intake valve 6 varies continuously or in step wise, such can be adapted by preparing a plurality of maps corresponding to the open and close timings of the air intake valve 6 or by preparing correction terms for the respective open and close timings.

Figure 15:
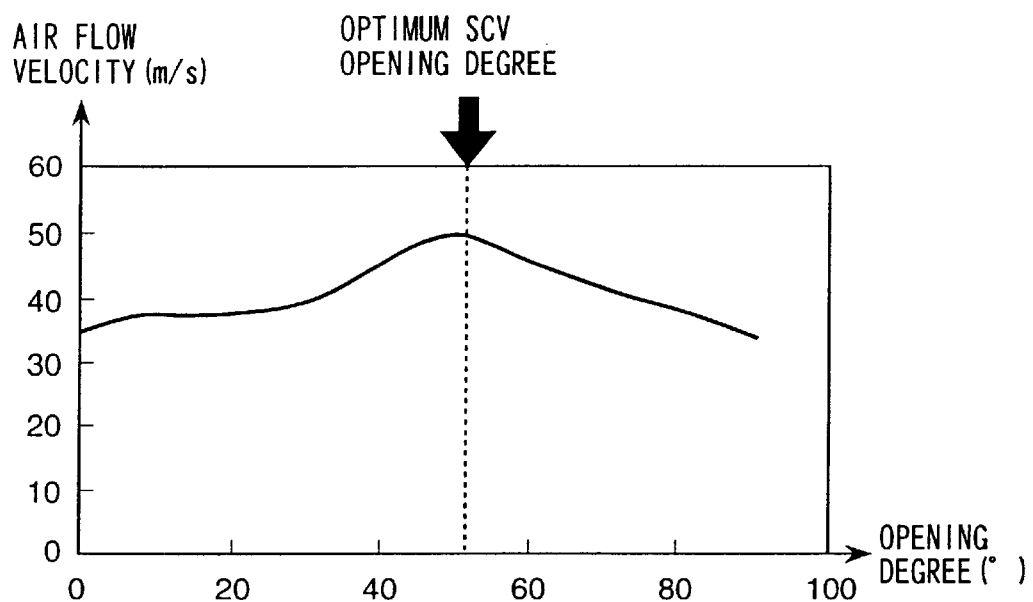
FIG. 15 is a diagram illustrating a relationship between opening degree of a swirl control valve and air flow velocity for the fuel injection time setting means in the control device as shown in FIG. 1.

Now, when the time delay of the injected fuel is eliminated by making use of the swirl control valve 10a because of the restriction with regard to attachment position of the injector 1 as referred to above, it is necessary to determine the valve opening degree where the air flow velocity in the air intake duct 18 during the air intake stroke is maximized, FIG. 15 shows a relationship between opening degree of the swirl control valve 10a and air flow velocity during the air intake stroke under the driving condition of engine rpm 2000 r/min and engine load 74.7 kPa. Wherein with regard to the opening degree of the swirl control valve 10a, as the value thereof increases the air intake duct 18 is closed more.

Figure 16:
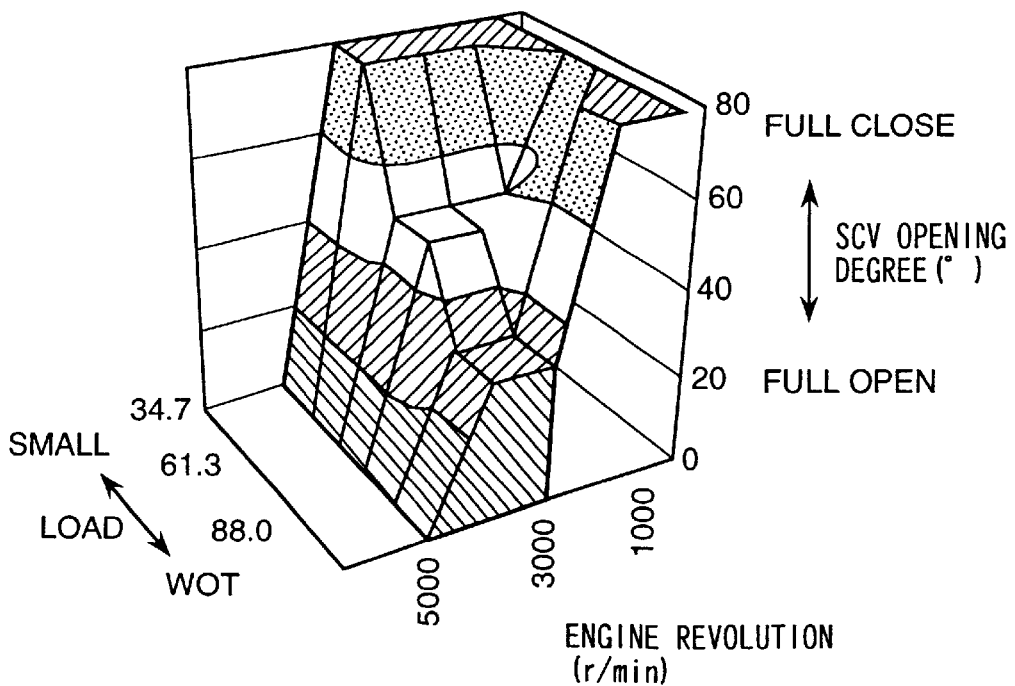
FIG. 16 is a three dimensional map for determining an optimum swirl control valve opening degree for the fuel injection time setting means in the control device as shown in FIG. 1.

As illustrated in FIG. 15, it is understood that when the opening degree of the swirl control valve 10a comes to about 50°, the air flow velocity is maximized, and the angle of about 50° is the optimum opening degree for the swirl control valve 10a. FIG. 16 is a three dimensional map for determining an optimum swirl control valve opening degree in the fuel injection time setting means, and in the present embodiment swirl control valve opening degrees representing the optimum values are set in advance depending on the engine rpm and the engine load, and by setting the valve opening degrees in advance depending on the driving conditions so that the air flow velocity in the air intake duct 18 during the air intake stroke is maximized, the transportation delay due to atomization of the injected fuel is corrected and the time delay can be eliminated.

Further, in the present embodiment, the optimum swirl control valve opening degree is determined for obtaining the maximum air flow velocity, however, it is sometimes happens that depending on, other than the structure of the air intake duct 18, the piston 8 and the head of the cylinder 9, the position of the ignition plug 12, the injection at the maximum air flow velocity does not necessarily coincide with the optimum air fuel mixture formation, therefore, the optimum value for the fuel injection completion timing for optimizing the air fuel mixture formation in the cylinder can be determined based on actual engine test results.

Figure 17:
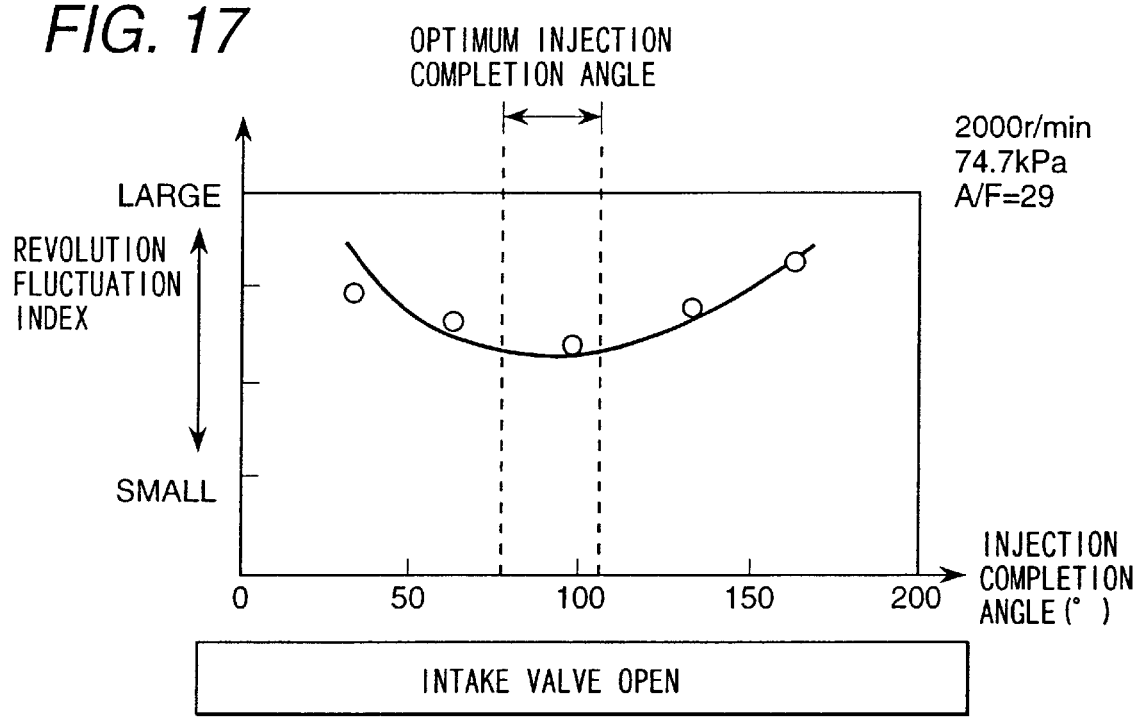
FIG. 17 is a diagram illustrating a relationship between injection completion angle and revolution fluctuation index representing a combustion stability of an internal combustion engine for a revolution fluctuation index arithmetic operation means in the control device as shown in FIG. 1.

Further, FIG. 17 shows a combustion stability for the internal combustion engine 10 which is determined by the revolution fluctuation index arithmetic operation means and illustrates a relationship between fuel injection completion angle during the air intake stroke with reference to TDC near the starting time of air intake and revolution fluctuation index CPi under a driving condition of engine rpm 2000 r/min, engine load 74.7 kPa and air fuel ratio 29.

The revolution fluctuation index CPi is an index representing a combustion stability of the internal combustion engine 100 (for example, engine vibration and revolution fluctuation components), changes when varying the fuel injection completion angle, and as the value of the revolution fluctuation index CPi decreases, the combustion stability increases. As will be apparent from FIG. 17, the combustion stability can be enhanced around the fuel injection completion angle of about 80°~100° under the above driving condition, therefore, of which angle represents the optimum fuel injection completion angle. Accordingly, even when the present fuel injection time does not necessarily coincide with the actual optimum fuel injection time depending on the engine machine errors, if the minimum revolution fluctuation index CPi can be found out by varying the fuel injection completion timing during the air intake stroke under a steady driving condition, the fuel injection time for forming an optimum air fuel mixture can be corrected, thereby, the robust property of the engine control system is enhanced.

Figure 18:
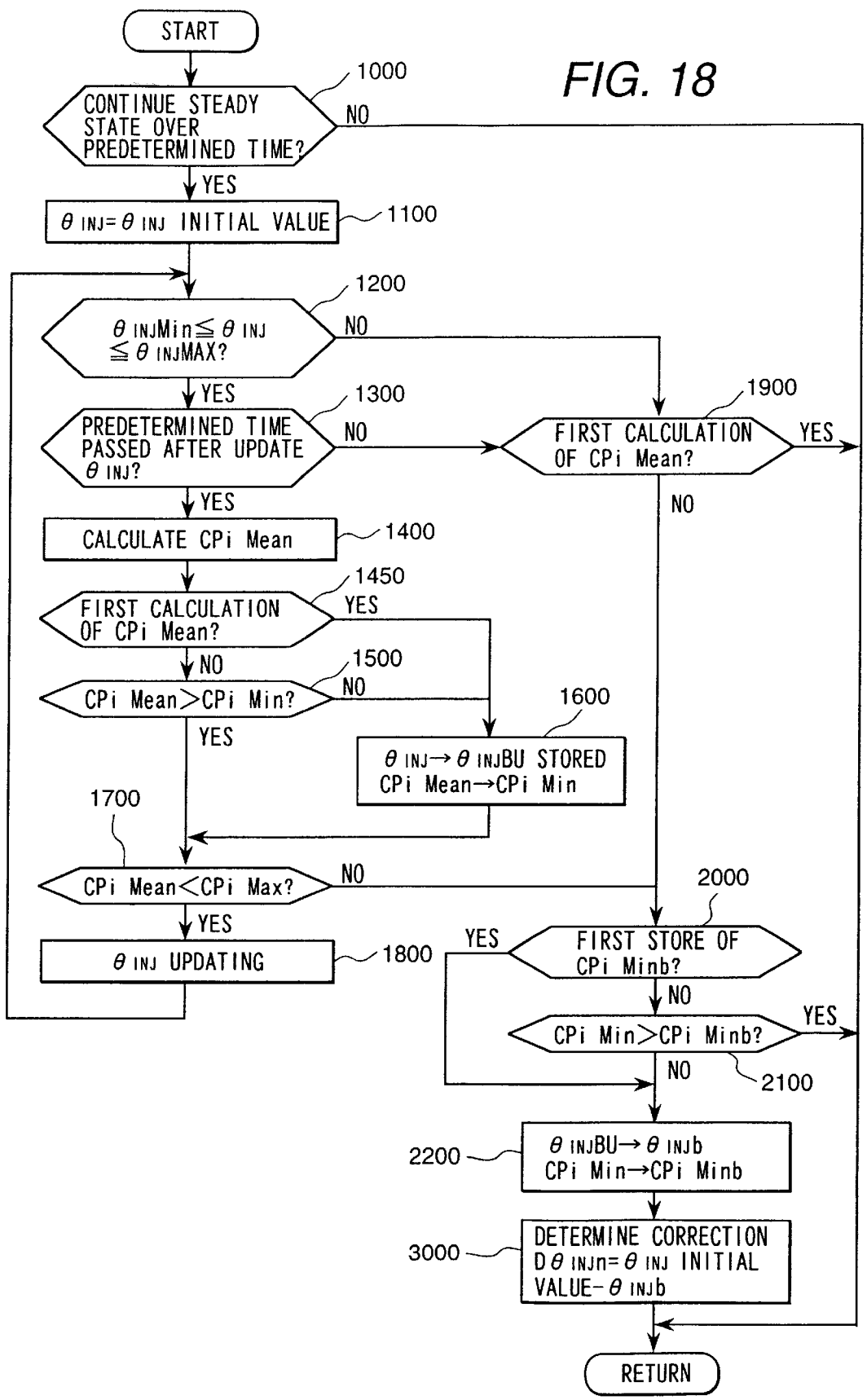
FIG. 18 is a flow chart for seeking the minimum value of revolution fluctuation index for the revolution fluctuation arithmetic operation means in the control device as shown in FIG. 1.

FIG. 18 is a flow chart for explaining the arithmetic operation for finding out the minimum value of the revolution index CPi performed by the revolution fluctuation index arithmetic operation means.

The present routine is repeated in a cycle, for example, for every 10 ms for performing the arithmetic operation.

At step 1000, it is judged whether or not a steady condition continues for a predetermined time based on such as variation band and variation rate of driving condition parameters such as engine rpm and engine load, and if the judgement is YES, the process moves to step 1100 and if the judgement is NO, the present routine ends.

At step 1100, while assuming the fuel injection completion angle (fuel injection completion timing) as θINJ with reference to the position TDC during the air intake stroke, an initial value θINJ in the concerned driving region is read among fuel injection completion angles set in advance in a form of three dimensional map and stored in a ROM, and thereafter the process moves to step 1200.

At step 1200, it is judged whether the read fuel injection completion angle θINJ falls in a range between θINJMin and θINJMax corresponding to the air intake stroke, and if the judgement is YES, the process moves to step 1300 and if the judgement is NO, the process moves to step 1900.

At step 1300, it is judged whether a predetermined time before inducing an actual revolution number fluctuation has passed after setting the fuel injection completion angle θINJ and if the judgement is YES, the process moves to step 1400 wherein the mean value of the revolution fluctuation indexes $CPi_{mean}$ is calculated, thereafter, the process moves to step 1450.

On the other hand, the judgement at step 1300 is NO, the process moves to step 1900 wherein it is judged whether the judgement in steps 1200 or 1300 is performed in connection with the first time mean value calculation of revolution fluctuation indexes CPi, and if the judgement is YES, the present routine ends and if the judgement is NO, the process moves to step 2000.

At step 1450, it is judged whether the mean value calculation of the revolution fluctuation indexes $CPi_{mean}$ is first time and if the judgement YES, the process moves to step 1600 wherein the first time calculated mean value of revolution fluctuation indexes $COi_{mean}$ is stored as it is as CPiMin and if the judgement is No, the process moves to step 1500.

At step 1500, it is judged whether the mean value $CPi_{mean}$ of the revolution fluctuation indexes calculated at step 1400 is larger than the stored minimum revolution fluctuation index CPiMin and if the judgement is YES, the process moves to step 1700 and if the judgement is NO, the process moves to step 1600 wherein the current fuel injection completion angle θINJ is stored as a backup fuel injection completion angle θINJBU and the calculated mean value $CPi_{mean}$ of the revolution fluctuation indexes is stored as minimum revolution fluctuation index CPiMin, thereafter, the process moves to step 1700.

At step 1700, it is judged whether the mean value $CPi_{mean}$ is smaller than the preset maximum value CPiMax and if the judgement if YES, in other words if no extreme revolution fluctuation is observed, the process moves to step 1800 wherein the fuel injection completion angle θINJ is updated. The updating of the fuel injection completion angle θINJ is performed in such a manner that a predetermined unit angle is added to a preset initial value θINJ of the fuel injection completion angle for every updating until a maximum angle is reached and thereafter the predetermined unit angle is subtracted from the maximum angle for every updating until a minimum angle is reached and the above sequence is repeated for every updating. In the above updating operation, if the angle is immediately returned to the initial value, it is possible that a large revolution fluctuation is induced, therefore, it is preferable that the fuel injection completion angle θINJ is returned in step wise to the initial value and thereafter to the minimum angle side by subtracting in step wise. Further, if the steady state period is short, it is impossible to determine means values $CPi_{mean}$ for all of the fuel injection completion angle θINJ, the driving regions and the range of the fuel injection completion angles for which the mean values are already determined are stored in a form of numeral values or a bit map, and when once a steady state moves out but returns under the same driving region, the minimum values $CPi_{mean}$ for the remaining range of the fuel injection completion angles can be calculated other than the range where the minimum values $CPi_{mean}$ are already calculated.

Further, at the step 1700, it is judged whether the mean value $CPi_{mean}$ is larger than the preset maximum value CPiMax, and if the judgement is NO, the process moves to step 2000, thus, the step wise modification of the injection timing by updating the fuel injection completion angle θINJ is interrupted, thereby, a large revolution fluctuation is prevented to ensure drivability.

At step 2000, it is judged whether the storing of the minimum value CPiMinb is the first time, and if the judgement is YES, the process moves to step 2200 and if the judgement is NO, the process moves to step 2100 wherein it is judged whether the current minimum value CPiMin is larger than the stored minimum value CPiMinb and if the judgement is YES, the present routine ends and if the judgement is NO, the process moves to step 2200.

At step 2200, the backup fuel injection completion angle θINJBU is stored as θINJb and the current minimum value CPiMin is stored as CPiMinb, and thereafter the process moves to step 3000 wherein a correction value DθINJ under the concerned driving region is determined from the initial value θINJ and the newly stored fuel injection completion angle θINJb, thereafter the present routine ends. Further, the stored fuel injection completion angles θINJb have to be determined for every driving region, however, it is actually difficult to determine the same for all of the driving regions, it is preferable to store as preset correction values for fuel injection completion angles or store in a map with respect to a roughly divided driving regions. Further, if the routine moves from step 1700 to step 2000 at the very first calculation, it is judged that the combustion condition of the internal combustion engine 100 is wrong for some other reasons, a processing other than the present routine such as enriching the air fuel ratio is performed.

With the thus constituted embodiments according to the present invention, the following advantages are obtained.

The internal combustion engine 100 is provided with the swirl control valve 10a which accelerates the air flow velocity in the air intake duct 18 and the injection port 52 of the injector 1 is disposed at or near the accelerated air flow area so as to make use of the accelerated air flow velocity, thereby, the transportation delay of the atomized fuel is resolved.

Further, the control unit 11 is provided with the fuel injection time setting means which causes to synchronize the fuel injection by the injector 1 with the air intake stroke of the internal combustion engine 100 and controls the fuel injection start so that an optimum air fuel mixture is formed at the time of fuel injection completion during the air intake stroke, and the fuel injection time setting means sets the fuel injection completion time at a time span including a maximum air flow velocity generating time, when the air flow velocity in the air intake duct is high, on the other hand when the air flow velocity in the air flow duct 18 is low, the fuel injection completion time is set at a time span earlier than the maximum air flow velocity generating time, namely, the setting of the fuel injection completion time is modified depending on the air flow velocity in the air intake duct 18, accordingly, a fuel injection for an optimum air fuel mixture formation can be realized, even if the combustion fluctuates depending on engine rpm and engine load, the time delay due to atomization of injected fuel droplet diameter is surely eliminated as well as the quality and formation of the air fuel mixture in the cylinder 9 is surely enhanced.

Still further, the control unit 11 is provided with the revolution fluctuation index arithmetic operation means which performs an arithmetic operation of a revolution fluctuation index representing combustion stability of the internal combustion engine 100, and the fuel injection time setting means corrects the fuel injection time with reference to the arithmetic operation result of the revolution fluctuation index arithmetic operation means, thus, even if the fuel injection time for forming the optimum air fuel mixture is deviated, such deviation is corrected, thereby, the robust property of the control system is enhanced and the reliability of the internal combustion engine 100 is increased.

Still further, the injector 1 for the MPI is constituted by such as the valve body 50, the swirler 53, the solenoid coil 55, the valve close biasing spring 56, the plunger rod 57 and the valve main body 58 including the injection port 52 and the valve seat face 51, and when a current is supplied to the solenoid coil 55 based on drive signals from the control unit 11, the valve body 50 is driven for valve open and valve close in high speed and the fuel in the injector 1 passed through the swirler 53 is atomized at the early opening stage of the valve body 50 by means of the pressure within the injector 1 and the shape of the swirler 53 and the immediate formation of the open volume at the injection port 52 by the high speed drive without necessitating the provision of multiple holes at the injection port and the collision of the injected fuel, thereby, quality and formation of the air fuel mixture in the cylinder is further enhanced.

Still further, the valve body 50 in the injector 1 is driven for valve open and valve close in high speed, thereby, the demand fuel amount is injected in a short time at an optimum time during the air intake stroke, and the dynamic flow rate can be increased in comparison with the conventional injector without changing the static flow rate, in that the continuing flow rate.

Still further, as the injection distance shortening means for shorting the distance from the injection port 52 to the respective cylinders 9, 9, . . . , the valve main body 58 of the injector 1 is elongated, thereby, the fuel transportation delay due to atomization of the injected fuel can be eliminated, and in addition, the distance from the injection port 52 to the respective cylinders 9, 9, . . . can be determined depending on the injected droplet diameter, the present injector 1 can be fully applied, even when the droplet diameter is varied depending on such as engine type or performance.

Hereinabove, the embodiments according to the present invention have been explained in detail. However, the present invention is not limited to the embodiments and covers a variety of modifications thereof in a sense without departing the spirit of the present invention as defined in the claims.

For example, the arithmetic operation of the demand fuel amount is performed from the intake air amount detected from the intake air sensor 2, however, the arithmetic operation of the demand fuel amount can be performed from an intake air duct pressure detected by a pressure sensor.

Further, the fuel injection time setting means performs the fuel injection completion control because of easiness of control so as to eliminate the time delay and to enhance the quality and formation of the air fuel mixture, however, it is possible to effect a so called fuel injection start control by making use of the fuel injection start timing (angle) so as to eliminate the time delay, in this instance, a time θT1stt from a reference signal angle θSTD, which is generated at a predetermined position for every cylinder 9, 9, . . . and is detected by the crank angle sensor 13, to a fuel injection start angle θIJST, which is set in advance by means of such as a map having variables such as engine rpm and engine load, has to be calculated, and the fuel injection start control is performed so that the optimum air fuel mixture is formed with the set fuel injection start timing.

Still further, when finding out the minimum value of the revolution fluctuation index CPi with the revolution fluctuation index arithmetic operation means, a fuel injection start angle can be used in place of the fuel injection completion angle, further, when the open and close timing of the air intake valve 6 is variable, the range of the fuel injection start angle can be modified depending on the varied timing.

Still further, in the present embodiments, the air intake duct 18 is constituted by a branched air intake duct having two air intake ports and the injector 1 having the elongated nozzle is designed to inject the atomized fuel toward the cylinder 9 in two directions, however, an injector which injects fuel in one direction can be used. As illustrated in FIG. 19, when the injector having an elongated nozzle which injects fuel in one direction (illustrated in solid lines) injects fuel to only one side of the ports among the two air intake ports, the attachment position of the injector to the air intake duct can be moved close toward the air intake valve without being affected by a partition wall to thereby further shorten the injection distance L, and the time delay of the injected fuel is also eliminated with this measure.

As will be understood from the above, the control device for an internal combustion engine according to the present invention causes to inject fuel in synchronism with and during the air intake stroke of the internal combustion engine, the air intake duct is provided with the air flow velocity accelerating means and the fuel injection valve makes use of the accelerated air flow velocity by disposing the injection port thereof in the air intake duct at or near the air flow area where the velocity thereof is accelerated, thereby, the time delay due to atomization of the injected fuel is eliminated.

What is claimed is:

1. A control device for an internal combustion engine comprising fuel injection valves which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with and during an air intake stroke for the internal combustion engine as well as respective injection ports of the fuel injection valves are positioned at or near an accelerated air flow portion formed by the air flow velocity accelerating means, further comprising a means for performing an arithmetic operation of a revolution fluctuation index representing combustion stability of the internal combustion engine, and wherein the fuel injection time of the fuel injection valves is corrected based on the arithmetic operation result obtained by the revolution fluctuation index arithmetic operation means.

2. A control device for an internal combustion engine according to claim 1, wherein the fuel injection time of the fuel injection valves is determined by setting either a fuel injection start timing or a fuel injection completion timing.

3. A control device for an internal combustion engine according to claim 2, wherein when the air flow velocity in the air intake port is comparatively high, the fuel injection completion timing of the fuel injection valves is set at or near the time where the maximum air flow velocity appears.

4. A control device for an internal combustion engine according to claim 1, wherein a valve main body of each of the fuel injection valves is elongated so that the fuel injected from the injection port is supplied into respective cylinders during the air intake stroke of the internal combustion engine.

5. A control device for an internal combustion engine comprising fuel injection valves which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with and during an air intake stroke for the internal combustion engine as well as respective injection ports of the fuel injection valves are positioned at or near an accelerated air flow portion formed by the air flow velocity accelerating means, wherein the fuel injection time of the fuel injection valves is determined by setting either a fuel injection start timing or a fuel injection completion timing, and when the air flow velocity in the air intake port is comparatively low, the fuel injection completion timing of the fuel injection valves is set at the time before the maximum air flow velocity appears.

6. A control device for an internal combustion engine according to claim 5, further comprising a means for performing an arithmetic operation of a revolution fluctuation index representing combustion stability of the internal combustion engine, and wherein the fuel injection time of the fuel injection valves is corrected base on the arithmetic operation result obtained by the revolution fluctuation index arithmetic operation means.

7. A control device for an internal combustion engine comprising fuel injection valves which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with and during an air intake stroke for the internal combustion engine as well as respective injection ports of the fuel injection valves are positioned at or near an accelerated air flow portion formed by the air flow velocity accelerating means wherein the fuel injection time of the fuel injection valves is determined by setting either a fuel injection start timing or a fuel injection completion timing, further comprising a means for performing an arithmetic operation of a revolution fluctuation index representing combustion stability of the internal combustion engine, and wherein the fuel injection time of the fuel injection valves is corrected based on the arithmetic operation result obtained by the revolution fluctuation index arithmetic operation means.

8. A control device for an internal combustion engine comprising fuel injection valves which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with and during an air intake stroke for the internal combustion engine as well as respective injection ports of the fuel injection valves are positioned at or near an accelerated air flow portion formed by the air flow velocity accelerating means wherein the fuel injection time of the fuel injection valves is determined by setting either a fuel injection start timing or a fuel injection completion timing when the air flow velocity in the air intake port is comparatively high, the fuel injection completion timing of the fuel injection valves is set at or near the time where the maximum air flow velocity appears, further comprising a means for performing an arithmetic operation of a revolution fluctuation index representing combustion stability of the internal combustion engine, and wherein the fuel injection time of the fuel injection valves is corrected based on the arithmetic operation result obtained by the revolution fluctuation index arithmetic operation means.

9. A control device for an internal combustion engine comprising fuel injection valves which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with and during an air intake stroke for the internal combustion engine as well as respective injection ports of the fuel injection valves are positioned at or near an accelerated air flow portion formed by the air flow velocity accelerating means, wherein a distance from the injection port of the respective fuel injection valves to corresponding cylinder is determined based on the fuel droplet diameter injected by the fuel injection valves.

10. A control device for an internal combustion engine according to claim 9, wherein each valve body of the fuel injection valves is driven in high speed so as to enhance atomization of the fuel injected from the respective injection ports of the fuel injection valves.

11. A control device for an internal combustion engine according to claim 9, wherein each valve body of the respective fuel injection valves is driven so that the injected fuel droplet diameters at the start of injection and at the completion of injection are substantially the same.

12. A control device for an internal combustion engine according to claim 9, wherein each valve body of the respective fuel injection valves is driven so that the diameter of the fuel droplet injected by the fuel injection valves is below 70 $\mu$m.

13. A control device for an internal combustion engine according to claim 9, wherein a valve main body of each of the fuel injection valves is elongated so that the fuel injected from the injection port is supplied into respective cylinders during the air intake stroke of the internal combustion engine.

14. A control device for an internal combustion engine, comprising fuel injection valves which are disposed at an air intake port for the internal combustion engine and inject fuel from the air intake port toward respective cylinders for the internal combustion engine; and an air flow velocity accelerating means which accelerates air flow velocity in the air intake port, wherein the fuel injection time from the fuel injection valves is controlled in synchronism with and during an air intake stroke for the internal combustion engine as well as respective injection ports of the fuel injection valves are positioned at or near an accelerated air flow portion formed by the air flow velocity accelerating means, when the air flow velocity in the air intake port is comparatively high, the fuel injection completion timing of the fuel injection valves is set at or near the time where the maximum air flow velocity appears, wherein a valve main body of each of the fuel injection valves is elongated so that the fuel injected from the injection port is supplied into respective cylinders during the air intake stroke of the internal combustion engine.

* * * * *